United States Patent
Ickovic

(10) Patent No.: US 12,323,882 B2
(45) Date of Patent: *Jun. 3, 2025

(54) SYSTEMS, METHODS, AND PROGRAM PRODUCTS FOR DIGITAL PET IDENTIFICATION

(71) Applicant: ICKOVIC & BLISS, INC., Henderson, NV (US)

(72) Inventor: Thomas S. Ickovic, Henderson, NV (US)

(73) Assignee: ICKOVIC & BLISS, INC., Henderson, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/206,468

(22) Filed: Jun. 6, 2023

(65) Prior Publication Data

US 2024/0015480 A1    Jan. 11, 2024

Related U.S. Application Data

(63) Continuation of application No. 17/359,815, filed on Jun. 28, 2021, now Pat. No. 11,778,420.

(60) Provisional application No. 63/198,457, filed on Oct. 20, 2020, provisional application No. 63/045,419, filed on Jun. 29, 2020.

(51) Int. Cl.
| | |
|---|---|
| *H04W 84/18* | (2009.01) |
| *A01K 11/00* | (2006.01) |
| *G06F 3/147* | (2006.01) |
| *H04W 4/02* | (2018.01) |
| *H04W 4/029* | (2018.01) |
| *H04W 4/80* | (2018.01) |

(Continued)

(52) U.S. Cl.
CPC ........... *H04W 4/029* (2018.02); *A01K 11/008* (2013.01); *G06F 3/147* (2013.01); *H04W 4/027* (2013.01); *H04W 4/80* (2018.02); *H04W 84/18* (2013.01); *A01K 27/006* (2013.01); *G06V 40/197* (2022.01)

(58) Field of Classification Search
CPC ............................. A01K 11/008; A01K 5/02
USPC ..................................... 342/357.52; 119/859
See application file for complete search history.

(56) References Cited

U.S. PATENT DOCUMENTS

| | | | |
|---|---|---|---|
| 10,080,343 B1 * | 9/2018 | Chu ..................... | A01K 5/0114 |
| 2011/0297090 A1 * | 12/2011 | Chamberlain ....... | A01K 5/0291 |
| | | | 119/51.02 |

(Continued)

FOREIGN PATENT DOCUMENTS

WO    2019067473 A1    4/2019

OTHER PUBLICATIONS

Extended Search Report issued in EP Application No. 21832449.9, dated Jun. 20, 2024.

*Primary Examiner* — Kiet M Doan
(74) *Attorney, Agent, or Firm* — Amster, Rothstein & Ebenstein LLP

(57) ABSTRACT

Systems and methods for identifying and tracking pets by use of a pet identification tag or image recognition techniques are disclosed. In exemplary embodiments, a mobile computing device communicates with a pet identification tag over a near-field communication link and a remote server over a wireless communication link. The mobile computing device is configured to identify a pet based on a unique identifier for the tag and/or to provide an image of a pet to (Continued)

the remote server, and to download information about the pet from the remote server using the unique identifier or pet image.

9 Claims, 16 Drawing Sheets

(51) Int. Cl.
*A01K 27/00* (2006.01)
*G06V 40/18* (2022.01)

(56) References Cited

U.S. PATENT DOCUMENTS

| 2013/0285815 A1* | 10/2013 | Jones | A01K 11/008 |
| | | | 340/573.3 |
| 2014/0099472 A1 | 4/2014 | Greenhill et al. | |
| 2015/0334994 A1 | 11/2015 | Prasad | |
| 2018/0098523 A1* | 4/2018 | Basom | A01K 11/008 |
| 2020/0160009 A1 | 5/2020 | Vatn | |

* cited by examiner

SYSTEMS, METHODS, AND PROGRAM PRODUCTS FOR DIGITAL PET IDENTIFICATION

RELATED APPLICATIONS

This application is a continuation based on U.S. patent application Ser. No. 17/359,815, filed Jun. 28, 2021 and entitled "SYSTEMS, METHODS, AND PROGRAM PRODUCTS FOR DIGITAL PET IDENTIFICATION,", which in turn claims priority to and the benefit of U.S. Provisional Application No. 63/045,419, filed Jun. 29, 2020 and entitled SYSTEMS, METHODS, AND PROGRAM PRODUCTS FOR DIGITAL PET IDENTIFICATION, and which also claims priority to and the benefit of U.S. Provisional Application No. 63/198,457, filed Oct. 20, 2020 and entitled SYSTEMS, METHODS, AND PROGRAM PRODUCTS FOR DIGITAL PET IDENTIFICATION, the contents of these applications being incorporated herein by reference in their entirety.

FIELD

The present invention generally relates to systems and methods for electronically identifying and tracking a pet, such as a pet dog or cat, or other animals.

BACKGROUND

There is a significant risk that, at some point in a pet's life, that pet will become lost, missing, or be stolen. According to the American Humane Association, over ten million dogs and cats are lost every year in the United States alone. Only 23% of these lost pets are ever reunited with their owners.

Locating a lost or stolen pet, whether in a large city or in a remote rural location, presents significant technological challenges. Further, if a lost pet is picked up and enters a pet shelter, there is a significant risk that the pet's owner will never be contacted. Current technology is simply insufficient to enable a pet to be reunited with its owner. The pet will then either be adopted by another party or euthanized if adoption does not occur after a short while.

To address this crisis, in 2006, Congress passed the PETS Act, which requires states and municipalities seeking assistance from the Federal Emergency Management Association (FEMA) to make provisions to accommodate household pets and service animals in their evacuation plans after a major disaster or emergency. These accommodations include enabling the identification of pets and service animals both during and after an emergency. Accordingly, to comply with the PETS Act, first responders need a way to quickly identify an unaccompanied pet.

Historically, pet ID tags have been used to help identify lost pets so that the pet's owner can be contacted. Pet ID tags have also served other purposes, such as showing that a pet is licensed. Before the advent of electronic pet ID tags, engraved metal tags were used for pet identification. These metal tags, however, have a number of drawbacks. Metal tags are capable of providing only limited, and often outdated and inadequate, information about the animal wearing the tag. This is due to the limited area on which information can be engraved. Indeed, most metal tags only have room enough for a pet's name, license number, and one or two telephone numbers. When an owner moves or changes phone numbers, the information on the metal tag cannot be altered. Rather, the tag needs to be replaced, which can be time consuming. Further, the tags are primarily made of stainless steel and are prone to folding at the edges, as well as scratching and other wear and tear that causes the tag to become illegible over time. The inadequacy of such tags is made clear in an emergency situation, where accurate information about the pet (such as, for example, ownership and medical information) is critical.

Another pet identification technique has been through the use of chips injected below the skin surface of the pet. These chips require a pet to be transported to a shelter or veterinarian's office in order to implant the chip and to later scan the chip. However, easy scanning of the chip is not possible if a pet is found, for example, injured on the side of the road. Another problem with injected chips is that there are several different makes and models of chips used domestically and overseas. Most chip readers can only read one or two types of chips. Therefore, none of these injected chips are readable in all locations. Additionally, the data provided by injected chips is also very limited and potentially out of date.

Early electronic pet ID tags were an attempt to address the shortcomings of metal and implantable tags. Such early electronic tags, however, only provided a name and phone number associated with a pet, thus lacking more fulsome records about the pet. More recently, pet industry participants, such as PetHub, Inc., have developed and sold pet ID tags that help to better identify a pet that wears one, as well as the pet's owners. Such pet ID tags are capable of being scanned by a smartphone using near-field communication (NFC) to obtain an identifier for the tag. The pet ID tags are also affixed with a Quick Response (QR) code that can be photographed and deciphered by an application running on the smartphone. These features enable a smartphone or similar device to obtain an identifier associated with the pet that wears the tag. In turn, the smartphone may use that identifier to obtain additional information about the pet, such as, for example, contact information associated with the pet, photographs of the pet and its owner(s), and medical information. However, conventional pet ID tags have lacked unique identifiers, such as, for example, unique device identifiers.

Relatedly, conventional pet ID tags are not linked to a centralized database that can be searched independent of whether the party doing the searching is in possession of the tag. This independent searching ability allows first responders and pet shelters to search for pet information provided to them independent of the tag. This is useful for reuniting pets with their owners in situations where the tag is not accessible.

Furthermore, conventional tags that are used as part of a municipal pet licensing program generally include a description of a pet in a proprietary database, which is owned, managed, and maintained by the city or municipality. Municipal license tags, however, are generally for local use only, and the information associated with pets are stored in a closed database that can only be accessed by those designated animal control authorities. These databases tend to be proprietary, closed systems, and information contained therein is not publicly available. Hence, if a lost animal wearing a city license is found, the finder needs to contact municipal authorities to identify the pet, rather than calling the owner directly. This is a waste of both time and resources.

Further, even municipal animal databases from adjoining localities are generally not shared. When two cities or towns share a border between them, animals may wander and cross the border. If the animal is picked up in the neighboring jurisdiction, that jurisdiction must contact the jurisdiction in which the animal resides.

Furthermore, conventional pet ID tags are not enabled to communicate using Bluetooth 5.0. Such pet ID tags are unable to provide the expanded capabilities of Bluetooth 5.0, such as, for example, locate, identify, and track pets within a one-thousand-foot radius while either walking or driving. Indeed, in an emergency, first responders and animal control officers could use Bluetooth 5.0 technology to monitor the pet population of an entire area simply by driving through the area, thereby obtaining contact information, pet licensing data, vaccination status, and other pet-related information.

Conventional pet ID tags also tend to consume a lot of power. As such, they cannot sustain multiple years of uninterrupted operation using a relatively small battery. Indeed, current battery technology lacks the power density to provide a pet ID tag with enough energy to sustain three years of operating life to the tag.

What is needed are systems and methods whereby pet ID tags can uniquely identify and locate a pet wearing the tag and where the pet ID tag is enabled to take advantage of the communication capabilities of Bluetooth 5.0. Further, what is needed are pet ID tags that can harvest energy such that the tag can be used over a long, or potentially unlimited, lifetime without battery replacement.

In addition, what is needed are systems and methods whereby pets can be uniquely identified without requiring the pet to wear a pet ID tag.

SUMMARY

The present invention also addresses these technological problems by providing new and improved computer systems and methods for uniquely identifying a pet by facial, nose print, and/or iris recognition.

Systems and methods in accordance with some exemplary embodiments of the present invention electronically identify and track a pet that has fastened to it a Bluetooth-enabled digital pet identification (ID) tag. The pet ID tag is capable of Bluetooth, or other near field communication (NFC) with mobile devices, such as, for example, smartphones and laptop computers. The pet ID tag monitors and detects conditions and events related to the location and environment in which the pet wearing the pet ID tag is situated. The pet ID tag also communicates remotely with a central database server that is configured to store data about the pet to which the pet ID is fastened. The central database server communicates with an end user of a mobile device to provide information related to the pet, as well as alert the end user (or other parties, such as pet shelters and law enforcement) of conditions relating to the pet that warrant intervention.

Systems and methods in accordance with exemplary embodiments of the present invention may use, for example, facial recognition technology such that a user of a mobile device can take a photograph of a stray pet using the mobile device's camera. The photographic image can be compared, using an application on the mobile device, to images of registered pets stored in a central database. If a match is found, then the mobile device owner can be provided with associated identifying information regarding the stray pet, such as, for example, other photographs of the pet, pet owner information, and medical and behavioral information for the pet.

Further, systems and methods in accordance with exemplary embodiments of the present invention can uniquely identify pets by using nose print recognition and verification technology. By using such systems and methods, a user of a mobile device can take a zoomed photograph of the nose of a stray pet using the mobile device's camera. The nose print discernable in the zoomed photographic image of the pet's nose can be compared, using an application on the mobile device, to nose print images of registered pets stored in a central database. If a match is found, then the mobile device owner can be provided with associated identifying information regarding the stray pet, such as, for example, other photographs of the pet, pet owner information, and medical and behavioral information for the pet.

Further, systems and methods disclosed herein can utilize iris recognition, or iris biometrics, as an alternative to nose prints to uniquely identify stray pets.

Further, the systems, methods, and techniques disclosed herein are not limited to the identification of stray pets. Although the examples disclosed herein are generally applied to lost or stray pets, identical or similar techniques can be used to identify any animal that can have affixed to it a tag, or that possesses features that are uniquely identifying, and which can be photographed. Examples of such animals include livestock (such as cattle), service animals (such as carriage or police horses), and various athletic team mascots, the identification of all of which are within the scope of the present invention. The present invention addresses this and other technological problems by providing new and improved computer systems and methods for uniquely identifying a pet to which is fastened a pet ID tag that communicates with other computer systems using wireless technology, such as, for example, WiFi or Bluetooth.

According to an exemplary embodiment of the present invention, a system for displaying, on a display operatively connected to a mobile device, information associated with a pet, comprises: (A) one or more databases having stored thereon information comprising: 1) one or more unique identifiers, where each of the one or more unique identifiers is associated with a corresponding one of one or more wireless communication devices affixed to a corresponding one of one or more pets; 2) pet information related to each of the one or more unique identifiers, the pet information comprising one or more of the following: images of the corresponding pet, contact information associated with the corresponding pet, environmental conditions associated with the corresponding pet, behavior of the corresponding pet, and medical history of the corresponding pet; (B) one or more processors; and (C) a non-transitory computer readable memory operatively connected to the one or more processors and having stored thereon machine-readable instructions that, when executed by the one or more processors, cause the one or more processors to perform a method comprising: receiving, by one of the one or more wireless communication devices, via a near-field communication link, a first request from a mobile device; and sending, by the one of the one or more wireless communication devices to the mobile computing device, via the near-field communication link, a first response, the first response comprising the unique identifier associated with the wireless communication device, so the pet information associated with the unique identifier may be accessed from the one or more databases for display on the mobile computing device.

In an exemplary embodiment the first near-field communication link is a Bluetooth communication link.

In an exemplary embodiment the first near-field communication link is a WiFi communication link.

In an exemplary embodiment the first near-field communication link is a link in a mesh communication network.

In an exemplary embodiment each of the one or more wireless communication devices comprise: a housing; an antenna; a wireless transceiver operatively connected to the antenna; one or more near-field communication chips configured to transmit and receive electronic data via the wireless transceiver; and a non-transitory computer readable memory disposed within the housing.

In an exemplary embodiment each of the one or more wireless communication devices further comprise one or more sensor components configured to detect status of the wireless communication device.

In an exemplary embodiment the one or more sensor components comprise: an accelerometer configured to measure an acceleration status of the wireless communication device; a global positioning module configured to determine a geographic location status of the wireless communication device; and a temperature sensor configured to determine an ambient temperature status of the wireless communication device.

In an exemplary embodiment the detected status is stored in the non-transitory computer-readable memory of the corresponding one or more wireless communication devices.

In an exemplary embodiment the one or more wireless communication devices further comprise: a battery configured to provide power to the wireless communication device; and a lighting element configured to illuminate the wireless communication device.

In an exemplary embodiment the system further comprises a remote server.

In an exemplary embodiment the method further comprises: receiving, by the one of the one or more wireless communication devices, from the remote server, a second request; and sending, in response to the second request, from the one of the one or more wireless communications devices, to the remote server, the detected status of the one of the one or more wireless communication devices, for storage in the one or more databases as associated with the corresponding unique identifier of the one of the one or more wireless communication devices.

A method according to an exemplary embodiment of the present invention comprises the steps of establishing, by the mobile computing device, a first near-field communication link with a wireless communication device, wherein the wireless communication device is affixed to the pet; sending, by the mobile computing device, via the first near-field communication link, a first request to the wireless communication device; receiving, by the mobile computing device, via the near-field communication link, a first response, the first response comprising an identifier that uniquely identifies the wireless communication device; sending, by the mobile computing device, via a second wireless communication link, a second request to a remote server, the second request including the identifier; receiving, by the mobile computing device via the second wireless communication connection, a plurality of information associated with the identifier; and displaying, by the mobile computing device on the display operatively connected thereto, the plurality of information associated with the identifier.

In accordance with exemplary embodiments, a computer-implemented method of displaying, on a display operatively connected to a mobile computing device, information associated with a pet, comprises the steps of capturing, by the mobile computing device, an image imprinted on a surface of a wireless communication device, wherein the wireless communication device is affixed to the pet; processing, by the mobile computing device, the captured image to obtain an identifier that uniquely identifies the wireless communication device; sending, by the mobile computing device, via a first wireless communication link, a first request to a remote server, the first request including the identifier; receiving, by the mobile computing device via the first wireless communication connection, a plurality of information associated with the identifier; and displaying, by the mobile computing device on the display operatively connected thereto, the plurality of information associated with the identifier.

In accordance with exemplary embodiments, a computer-implemented method of storing information associated with a pet, comprises the steps of establishing, by the mobile computing device, a first near-field communication link with a wireless communication device, wherein the wireless communication device is affixed to the pet; sending, by the mobile computing device, via the first near-field communication link, a first request to the wireless communication device; receiving, by the mobile computing device from the wireless communication device, via the near-field communication link, a first response, the first response comprising an identifier that uniquely identifies the wireless communication device; associating, by the mobile computing device, a plurality of text and images with the identifier; sending, by the mobile computing device, via a second wireless communication link, a second request to a remote server, the second request including the identifier, the plurality of text and images, and an instruction to cause the remote server to store the identifier and the plurality of text and images in a remote database; and receiving, by the mobile computing device via the second wireless communication connection, a confirmation message from the remote server that the identifier and the plurality of text and images have been stored.

In accordance with exemplary embodiments, a wireless communication device comprises; a housing; an antenna; a wireless transceiver operatively connected to the antenna; a processor; and, operatively connected to the processor, a memory; one or more near-field communication chips configured to transmit electronic messages via the wireless transceiver; an accelerometer configured to measure an acceleration of the wireless communication device; a global positioning module configured to determine a geographic location of the wireless communication device; a temperature sensor configured to determine an ambient temperature of the wireless communication device; a battery configured to provide power to the wireless communication device; and a lighting element configured to illuminate the wireless communication device.

In accordance with exemplary embodiments, a wireless communication device comprises an individually identifiable near-field communication (NFC) and/or QR-coded pet ID tag. In embodiments, the pet ID tag is Bluetooth 5.0-enabled. In embodiments, the pet ID tag is configured with a data-based operating system accessible by a URL and is activated by either tapping, scanning, photographing, or utilizing Bluetooth activation. In embodiments, the pet ID tag communicates with a mobile communication device that executes an application that displays detailed pet profile pages (with identifying photographs). The mobile communication device provides for one-click dialing to a pet owner's phone to provide immediate and direct contact with the owner. In embodiments, the pet ID tag notifies a pet owner notification whenever the pet ID tag is activated. In embodiments, the pet ID tag is configured to display full color (RGB) LED light and to generate a full spectrum of colors and blinking patterns. In embodiments, the pet ID tag can be configured to act as a virtual fence creating a radius of up to 800 feet from an owner's mobile communication device or home. In embodiments, the pet ID tag can be accessed or "pinged" to disclose its current location. In embodiments, the pet ID tag can be configured as a node in a mesh network in order to expand its communication range. According to embodiments, the pet ID tag includes an embedded accelerometer that performs activity monitoring, battery management, bark detection, and the like. According to embodiments, the pet ID tag includes an embedded temperature sensor that is configured to provide alerts if an ambient temperature is too hot or too cold. In embodiments, the pet ID tag includes low-energy components and management system, and a battery having an average 2-year lifespan. In embodiments, the pet ID tag includes self-charging and energy harvesting components that regenerate energy produced by solar, vibrations, movement, or body heat. In embodiments, the pet ID tag has logging capabilities, and sends location, temperature daily activity, and other data to a remote server. According to embodiments, the remote server employs artificial intelligence and predictive analytics to data collected for training and personalized uses. According to embodiments, the remote server provides automated email and/or text message reminders for license renewals, rabies booster shots, veterinarian appointments, and other scheduled events. According to embodiments, the pet ID tag and remote server provides for the sending of lost pet alerts that notifies entities in close proximity to the tag, such as, for example, pet shelters located within a 20 mile radius, that a pet is lost or in distress. In embodiments, the pet ID tag and remote server provide for a "return to owner" feature that allows for an unlimited number of people (such as friends, neighbors, family, and veterinarians) who are pre-authorized to take custody of a pet if the pet owner is unavailable.

In accordance with exemplary embodiments, a computer-implemented method of transmitting, to a user device, information associated with a pet, comprises the steps of associating each one of a plurality of pet images with associated pet information; storing the pet images and associated pet images in a database; receiving a first pet image from a user device; retrieving one or more of the plurality of pet images from the database; processing the received first image and the one or more retrieved pet images with image recognition software; identifying as a matching pet image one of the one or more retrieved pet images that matches the received first pet image; retrieving from the database the pet data associated with the matching pet image; and transmitting the retrieved pet data to the user device

DESCRIPTION OF THE DRAWINGS

Exemplary embodiments of the present invention will be described with references to the accompanying figures, wherein.

DETAILED DESCRIPTION

Figure 1:
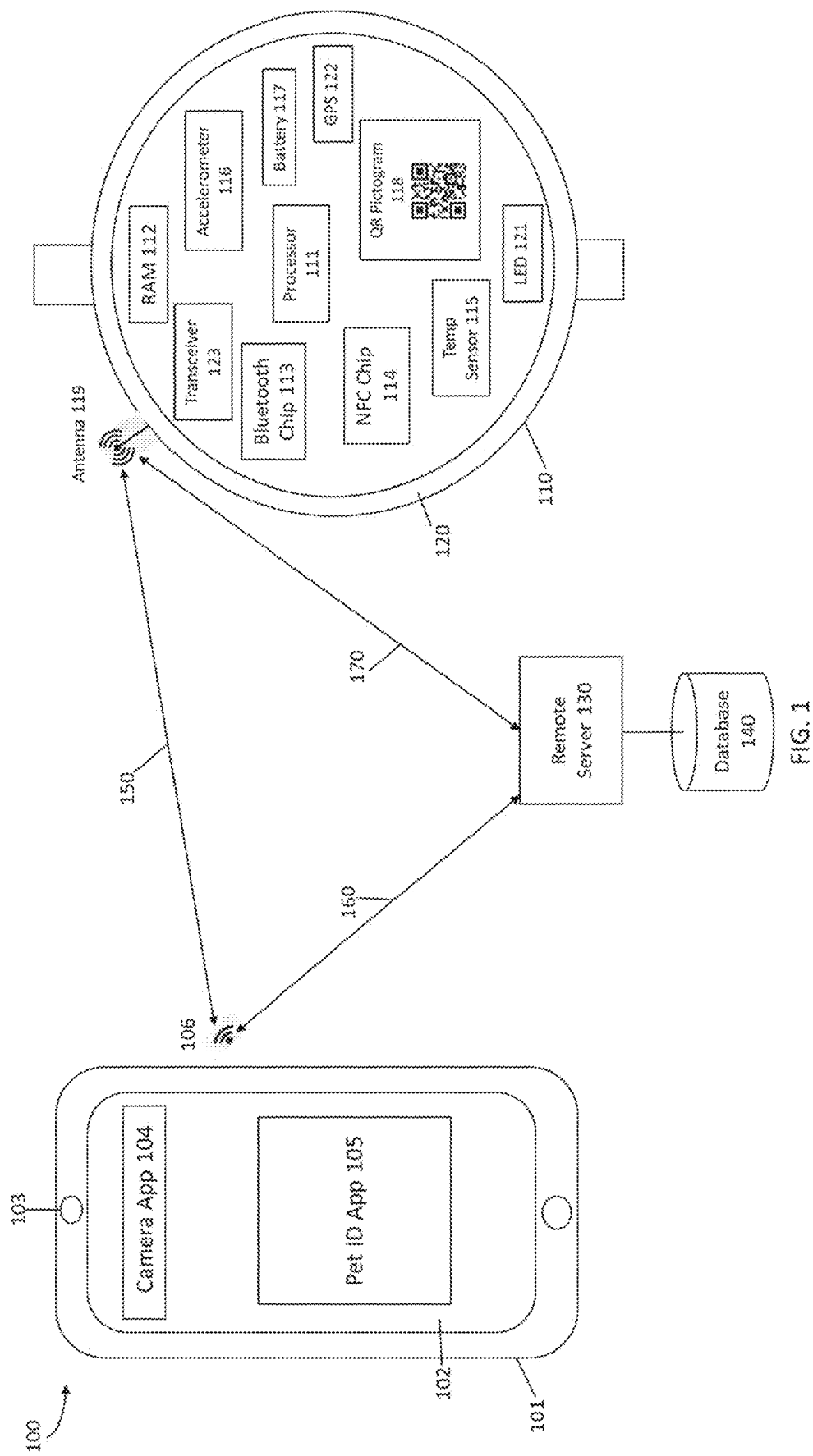
FIG. 1 illustrates an exemplary pet identification system in accordance with exemplary embodiments of the present invention.

In exemplary embodiments, the present invention addresses technological barriers to pet identification and tracking by providing a technological solution in the form of a computer system and process that utilizes a mobile computing device, a pet ID tag, and a remote server.

In exemplary embodiments, the pet ID tag monitors the location, activity, and ambient conditions of a pet that wears the tag and communicates related information to the remote server for future retrieval by a mobile computing device. The pet ID tag may be configured to be scanned, tapped, and/or photographed by a mobile computing device, which captures data from the scanning, tapping, or photographing. The mobile computing device processes the captured data to uniquely identify the tag and, by extension, the pet wearing the tag. The mobile computing device is capable of wireless communication with the pet ID tag, where the wireless communication may be near field communication (such as Bluetooth 5.0) or WiFi. The mobile computing device is also capable of remote communication with the remote server to download information associated with the scanned pet ID tag from the server and/or to upload information associated with the scanned pet ID tag to the remote server.

In exemplary embodiments, the present invention seeks to address the technological problem of electronically identifying and tracking pets through the use of an identification tag. Conventional pet ID tags are not equipped with a unique identifier that may be scanned and/or photographed. A unique identifier for the pet ID tag allows the tag to be associated with information that is unique to the pet that wears the tag. This enables a mobile computing device (such as a smartphone) that scans or taps the tag, or photographs a QR code on the tag, to quickly determine the tag's unique identity. Once the unique identity of the tag is determined, the mobile computing device can request to download and/or upload information from or to a remote server, where the information uniquely pertains to the wearer of the tag, such as, for example, photographs of the pet, dietary restrictions, and medical information, to name a few. The pet ID tag is also configured to communicate with the remote server to report monitored conditions, such as the geographic location of the pet ID tag, ambient temperature, whether the tag has been scanned, and activity information in connection with the wearer of the tag such as, for example, how many steps the wearer of the tag has taken during a time interval.

In exemplary embodiments, the present invention also preferably utilizes Bluetooth 5.0, which include greater speed and improved range as compared to prior Bluetooth versions. For example, Bluetooth 5.0 has four times the range, two times the speed, and eight times the broadcasting message capacity of older versions of Bluetooth. Indeed, Bluetooth 5.0-enabled devices can use data transfer speeds of up to 2 Mbps, which is double what prior versions support. A Bluetooth 5.0-enabled pet ID tag can also communicate over distances of up to 800 feet (or 240 meters), which is four times the 200 feet (or 60 meters) possible with earlier versions of Bluetooth. The present invention therefore addresses and solves technological barriers to the efficient identification of pets that have become separated from their owners.

FIG. 1 is a block diagram that illustrates a system, generally designated by reference number 100, in accordance with an exemplary embodiment of the present invention. The system 100 includes a mobile computing device 101, a pet ID tag 110, and a remote server 100.

Mobile computing device 101 can be a smartphone, a tablet computer, a laptop computer or other type of mobile computing device. Mobile computing device is equipped with a processor (not shown) that executes operating system and application program instructions and controls the physical hardware of the device. Mobile computing device 101 is equipped with a display 102, which can be, in embodiments, a touchscreen. Display 102 is configured to display a plurality of application programs ("apps") that include instructions stored on memory that, when executed by the processor, cause the processor to carry out operations related to the app. In this regard, mobile computing device 101 displays graphical user interfaces associated with a camera app 104 and a pet ID app 105. A user of mobile computing device 101 interacts with display 102 to operate camera app 104 and pet ID app 105 through the corresponding graphical user interfaces.

Camera app 104 is used to control camera 103, which may be an included feature of mobile device 101. In embodiments, camera 103 is a standard high- or low-resolution smartphone-integrated camera. Camera app 104 enables an end user of mobile device 101 to take high- or low-resolution photographs.

Pet ID app 105 is an application program that an end user interacts with through display 102. In embodiments, pet ID app 105 is a network-enabled application that communicates over a near field communication link, such as link 150, or over a remote communication link, such as link 160. To communicate over links 150 and 160, pet ID app 105 may access, through an appropriate application program interface (API), wireless network adapter 106 of mobile computing device 101. Communication over link 150 is typically near field communication (NFC), such as, for example, Bluetooth 5.0 or earlier versions of Bluetooth. Alternatively, communication link 150 can, in some embodiments, be a WiFi link, where mobile computing device 101 and pet ID tag 110 connect to the same WiFi network. Further, link 150 can, in embodiments, be a link in a mesh communication network (or meshnet) where several devices and routers are connected directly to one another. In such embodiments, pet ID tag 110 can communicate over an extended range greater than 800 feet, and can be located either indoors or outdoors. Thus, in embodiments, pet ID tag 110 can communicate with mobile devices carried by first responders within a home to enable quick location of a pet. Further, when communicating over a mesh network, pet ID tag 110 can communicate with other Bluetooth enabled pet ID tags within communication range. Communication over link 160, on the other hand, is typically over a cellular or WiFi connection to a wide area network, such as the Internet.

In exemplary embodiments, pet ID app 105 is an application program that is configured to provide an end user with the capability of determining the identity and associated information of a pet wearing a pet ID tag. Pet ID app 105 is configured to process information received from a pet ID tag, such as pet ID tag 110 depicted in FIG. 1. Pet ID app 105 receives data over a near field communication link, such as link 150, and processes that data to determine a unique identifier for the tag. According to embodiments, Pet ID app 105 extracts the unique identifier from a data stream received from the tag. Pet ID app 105 associates the unique identifier with data associated with a pet, such as medical data or photographs of the pet. Pet ID app 105 can be used by an end user to communicate, via link 160, to a remote server (such as remote server 130) to upload the data to remote server 130. Further, pet ID app 105 may be configured to create a data request, either automatically or as initiated by a user, that includes the unique identifier received from pet ID tag 110 and send the request over link 160 to remote server 130. Pet ID app 105 may be further configured to receive a response to the data request and display information received from remote server 130. In embodiments, pet ID app 105 may communicate over line 160 using a Uniform Resource Locater (URL) for remote server 130.

For example, in embodiments, pet ID app 105 sends a data request that includes a unique identifier for pet ID tag 110, along with request data, such as, for example, a request for a corresponding pet's latest photographs, the pet's medical records, and the pet's owner's contact information. Pet ID app 105 then receives this data in a response from remote server 130 and displays the photographs and medical and owner data on display 102 of mobile computing device 101. Alternatively, pet ID app 105 can send a data request to remote server 130 for all data corresponding to the unique tag identifier. In response, pet ID app 105 would receive all data corresponding to the pet associated with the tag (e.g., photographs, medical records, owner contact information, location data for the tag, temperature of the location of the tag, activity information for the tag wearer, and other data). Pet ID app 105 can then makes this data available for display on display 102.

Furthermore, in exemplary embodiments, pet ID app 105 is configured to receive alert information from remote server 105. Examples of alert information may include times and locations that pet ID tag 110 was scanned, tapped, or photographed. This provides an indication of where a pet is located when mobile computing device 101 is out of range for Bluetooth or other near field communication. Another example of an alert is the ambient temperature of the environment in which the tag is situated. Such a feature serves to alert an end user of mobile computing device 101 whether the pet wearing the tag is located in a place of excessive heat or cold, such as, for example, a locked automobile in summer or tied up outdoors in winter. Another example of an alert is one which alerts the end user of pet ID app 105 of unusual activity (or long periods of inactivity) by the wearer of the tag. Such an alert can inform the end user that a pet is in distress or is unwell. Pet ID app 105 can also receive an alert that the pet ID tag 110 has been removed from the pet wearing it, or that the battery of the tag is low. Many other types of alerts are possible and within the scope of the present invention. According to exemplary embodiments, alerts are received as messages on link 160 between remote server 130 and mobile computing device 101. Alerts may be expressed as electronic messages, such as texts or emails, sent to the user through the mobile computing device 101, as audio alerts played through speakers (now shown) of the mobile computing device 101 and/or as vibration or other motion alerts activated on the mobile computing device 101.

In exemplary embodiments, once pet ID app 105 receives an alert, the app can provide an alert signal on mobile computing device 101, such as, for example, an alarm or beep. Pet ID app 105 may then display information corresponding to the alert, such as a map of the location of the tag or local temperature and weather conditions at the tag's location.

As referred to above, system 100 also includes pet ID tag 110. According to exemplary embodiments, pet ID tag 110 is an electronic device that is configured to be fastened or affixed to a pet, such as a dog or cat. As shown in FIG. 1, pet ID tag 110 includes a housing 120. In exemplary embodiments, housing 120 is made from carbon fiber material, built to a military grade standard. As such, exemplary embodiments of housing 120 are completely waterproof. In one or more embodiments, housing 120 is composed of a durable and lightweight plastic material that is resistant to scratching, etching, and similar wear and tear, and which maintains its shape over time. In embodiments, housing 120 has a physical diameter of less than 32 millimeters.

Pet ID tag 110 includes a processor 111. Processor 111 is the central processing unit of the tag, which is configured to execute operating system and application program instructions and is the central controller for the tag. In embodiments, processor 111 can be a microcontroller capable of being embedded for use in wearable devices, such as, for example, the PIC family of microcontrollers manufactured by Microchip Technology, Inc., the MCS family of microcontrollers manufactured by Intel Corp., or the LPC family of microcontrollers manufactured by NXP Semiconductors N.V.

Pet ID tag 110 also includes random access memory (RAM) 112, which is, in exemplary embodiments, an on-board memory module. RAM 112 can be either dynamic random access memory (DRAM) or static random access memory (SRAM), as those terms are understood by those skilled in the art. RAM 112 is configured to store operating system, device driver, and application program instructions, as well as associated data buffers. RAM 112 is operatively connected to processor 111 such that processor 111 can fetch data and instructions for execution and store results.

As shown in FIG. 1, pet ID tag 110 also includes a Bluetooth chip 113. According to exemplary embodiments, Bluetooth chip 113 is a module that is capable of communicating over a Bluetooth communication link. In embodiments, Bluetooth chip 113 is configured to support Bluetooth 5.0 or earlier versions of Bluetooth. Bluetooth chip 113 may, alternatively, support other communication protocols that provide for near field communication (e.g., communication at a distance of 800 feet or less) with a similarly enabled device. As shown, Bluetooth chip 113 communicates over a near field communication link, such as link 150, via a wireless transceiver 123, which is operatively connected to antenna 119. In embodiments where link 150 is a WiFi link, then pet ID tag 110 includes a WiFi network adapter or wireless transceiver (not shown) which enables communication over WiFi. In embodiments, antenna 119 can be a ceramic antenna. In embodiments, Bluetooth chip 113 is an ultra-low power integrated circuit.

In embodiments, Bluetooth chip 113 can be configured to communicate with smart home security devices, such as security cameras and alarm systems. In addition, Bluetooth chip 113 can be configured to communicate with another Bluetooth chip of a nearby pet wearing another pet ID tag. Such communication can, in embodiments, facilitate contact tracing, whereby it may become important to track which animals a potentially infected animal has come into contact with.

In some embodiments, where WiFi rather than Bluetooth communication is used, pet ID tag 110 includes a wireless transceiver that is adapted to communicate over a WiFi network. In such embodiments, the WiFi transceiver may take the place of Bluetooth chip 113 and is configured to communicate with devices external to pet ID tag 110.

Pet ID tag 110 also includes NFC chip 114. In embodiments, NFC chip 114 is separated from Bluetooth chip 113, and provides a pet ID tag 110 with a unique identifier. This unique identifier can be referred to as a unique serial number. NFC chip 114 is operatively connected to wireless transceiver 123, which itself is operatively connected to antenna 119, and thereby communicates over line 150. NFC chip 114 is configured to be scanned by a nearby device, such as mobile computing device 101. In embodiments, mobile computing device 101 sends a signal over link 150 to antenna 119. The signal is detected by wireless transceiver 123, which relays the signal to NFC chip 114, which then, itself, sends a signal over line 150 to mobile computing device 101. The signal sent by NFC chip 114 includes, in exemplary embodiments, the unique identifier of pet ID tag 110.

Referring back to FIG. 1, pet ID tag 110 also includes temperature sensor 115. In exemplary embodiments, temperature sensor 115 is operatively connected to processor 111. Temperature sensor 115 is configured to monitor the ambient temperature of pet ID tag 110. In exemplary embodiments, temperature sensor 115 provides periodic updates of the ambient temperature to processor 111. In other exemplary embodiments, temperature sensor 115 provides the ambient temperature only when the temperature changes by a predefined amount. Processor 111 receives the temperature updates and, in some exemplary embodiments, executes a program that transmits, via wireless transceiver 123 and antenna 119, the ambient temperature via a cellular or WiFi link (such as link 170) to a remote server, such as remote server 130. As will be explained, this enables remote server 130 to provide warnings to mobile device 101 or other third parties regarding dangerous temperature conditions.

According to embodiments, temperature sensor 115 may be a thermocouple made from, for example, nickel chromium/constantan, iron/constantan, nickel chromium/aluminum, nicrosil/nisil, copper/constantan, and/or platinum rhodium. Alternatively, in embodiments, temperature sensor 115 may be a resistance temperature detector (RTD) made from platinum or other appropriate conductors. In embodiments, temperature sensor 115 may be a thermistor made from a polymer or ceramic material. In embodiments, temperature sensor 115 may be a semiconductor based integrated circuit (IC) that senses the temperature of the ambient air around it. In embodiments, temperature sensor 115 may also detect the body temperature of the animal wearing pet ID tag 110, thereby enabling remote diagnosis of a medical condition of the pet.

Pet ID tag 110 also includes accelerometer 116. Accelerometer 116 is configured to measure acceleration of pet ID tag 110. For example, as the pet wearing pet ID tag 110 runs or jumps, accelerometer 116 will detect a change in the pet's acceleration. Accelerometer 116 is also operatively connected to processor 111. As such, accelerometer 116 provides periodic updates of the pet's acceleration (i.e., the pet's activity) to processor 111. Accelerometer 116 can also detect, for example, in the case of dogs, whether the pet is barking excessively. Further, accelerometer 116 can also, in some exemplary embodiments, provide processor 111 with a pet's lack of activity. For example, accelerometer 116 may detect that pet ID tag 110 has not had any activity (i.e., acceleration) over a predetermined time period and report this condition to processor 111. Processor 111, in turn, executes a program that transmits, via wireless transceiver 123 and antenna 119, the activity information received from accelerometer 116 via a cellular or WiFi link (such as link 170) to a remote server, such as remote server 130. As will be explained, this enables remote server 130 to provide warnings to mobile device 101 or other third parties regarding unusual activity (or absence of activity) of the pet wearing the tag. Further, in embodiments, processor 111 may accumulate and store activity data based on monitoring accelerometer 116. Such activity data may be stored on the tag itself, for example, in RAM 112.

In embodiments, accelerometer 116 may be a board mounted embedded accelerometer configured for an acceleration range of from ±20 g to ±6000 g. In embodiments, accelerometer 116 may be piezoelectric accelerometer. Alternatively, accelerometer 116 can be a MEMS accelerometer.

As shown in FIG. 1, pet ID tag 110 also includes battery 117. According to exemplary embodiments, battery 117 provides electrical power to pet ID tag 110. Battery 117 may be operatively connected to processor 111. In some embodiments, battery 117 also includes an associated battery monitor. In these exemplary embodiments, battery 117 is able to monitor power levels and determine whether the power level has fallen below a predetermined threshold. In these exemplary embodiments, the associated battery monitor provides a warning signal to processor 111, indicating either the current power level or the amount of time the battery has before it will be completely drained and/or has reached a critical level of power. Processor 111, in exemplary embodiments, may execute a program that transmits, via wireless transceiver 123 and antenna 119, the battery information via a cellular or WiFi link (such as link 170) to a remote server, such as remote server 130. As will be explained, this enables remote server 130 to provide warnings to mobile device 101 or other third parties regarding the condition of battery 117. In embodiments, battery 117 is a long life battery, capable of powering pet ID tag 110 for three years or more.

In embodiments, battery 117 may work in tandem with an energy harvesting mechanism (not depicted) that is capable of being included with pet ID tag 110. Such an energy harvesting mechanism can include photovoltaic (solar) cells, vibration/motion harvesting, or RF energy harvesting. In embodiments, the selection of an energy harvesting mechanism can be based, at least in part, on a determination of how much energy pet ID tag 110 will require over its lifetime.

In embodiments, in addition to communicating with remote server 130 over a cellular or WiFi link, pet ID tag 110, via processor 111, wireless transceiver 123, and antenna 119, may communicate over these links with a central emergency response service in order to directly alert those services of a dangerous condition relating to the pet wearing the tag.

In exemplary embodiments, pet ID tag 110 also includes QR pictogram 118. QR pictogram 118 is, in exemplary embodiments, a machine-readable matrix barcode that is printed or affixed to housing 120 of pet ID tag 110. As such, QR pictogram 118 can be photographed by a camera, such as camera 103 on mobile computing device 101. QR pictogram 118 has encoded therein a unique identifier for pet ID tag 110. According to exemplary embodiments, this unique identifier matches or is associated with the unique identifier provided by NFC chip 114. Typically, an end user of mobile computing device 101 can photograph QR code 118, using camera 103. Mobile computing device 101 has stored thereon software that is configured to analyze the digital image of QR code 118 and decipher the unique identifier of pet ID tag 110.

FIG. 1 also shows that pet ID tag 110 includes light emitting diode (LED) 121. In exemplary embodiments, LED 121 is a lighting element that is configured to generate a spectrum of colors, which enables pet ID tag 110 to convey different alert information based on the color. LED 121 is operatively connected to processor 111. According to exemplary embodiments, processor 111 may determine the time of day from an internal clock (not shown). Based on the determined time of day, processor 111 may be configured to cause LED 121 to generate a color that is easily detected at that time. For example, processor 111 may cause LED 121 to generate a bright magenta color at night. Further, processor 111 may cause LED 121 to flash or display a certain sequence of colors based on other data, such as ambient temperature, activity of the pet wearing the tag, and remaining battery life. Further, in embodiments, processor 111 can be configured to cause LED 121 to blink according to one or more patterns in order to attract attention to the wearer of the tag.

FIG. 1 also shows that pet ID 110 may include a global positioning system (GPS) 122. GPS 122 may determine geographic coordinates at which pet ID tag 110 is located. GPS 122 is operatively connected to processor 111 and provides geographic coordinates to the processor so that the location of pet ID tag 110 can be tracked. In embodiments, GPS 122 can be configured for radio frequency identification (RFID) using a microchip or transistor, and which is operatively coupled to wireless transceiver 123 to send and receive signals. GPS 122 may also, in embodiments, be configured for radio tracking and/or GPS and satellite tracking. Further, in embodiments, processor 111 may accumulate and store location data based on monitoring of GPS 122. Such location data may be stored on the tag itself, for example, in RAM 112.

In embodiments, pet ID tag 110 can include other sensors, such as, for example, a separate sensor to monitor the temperature of the pet, a glucose monitor that monitors blood glucose levels, and an oxygen monitor that monitors the level of oxygen in the blood of the pet. In embodiments, pet ID tag 110 can also include two-way voice communication capabilities as well as high frequency speakers, which enable direct communication with the pet. The use of monitors for temperature and other health-oriented data associated with a pet can be used in a process to automatically record this data with a central server, such as remote server 130, described below.

As shown in FIG. 1, system 100 also includes remote server 130. In exemplary embodiments, remote server 130 can be a desktop computer, a laptop computer, a tablet, a smartphone, or any server quality computer. Remote server 130 is configured to communicate over a wide area or local area network. As shown, remote server 130 communicates over remote links 160 and 170. Link 160 is a communication link between remote server 130 and mobile computing device 101. Link 170 is a communication link between remote server 130 and pet ID tag 110. In embodiments, remote server 130 is configured to receive and respond to requests from mobile computing device 101. For example, mobile computing device 101 may send a request to create an account for a pet ID tag 110. In such a case, remote server 130 receives a unique identifier for pet ID tag 110, as well as associated data, such as photographs of the pet, owner contact information, and medical data associated with the pet. Remote server 130 creates the account in database 140, which is operatively coupled to remote server 130. Database 140 associates the unique identifier for pet ID tag 110 with the associated information. In exemplary embodiments, database 140 may be, for example, a relational database, a hierarchical database, or a structured text file. In embodiments, database 140 is a centralized, globally accessible database that is public and non-proprietary. That is, database 140 may be configured to be queried separately from a device other than mobile device 101. For example, in embodiments, database 140 can be configured to be accessed, updated, and queried through a web interface that is accessible to the public or to animal control authorities. In some embodiments, database 140 is configured to be deployed in a cloud computing environment and to be maintained as a separate entity from the manufacturer of pet ID tag 110. Thus, in situations where the tag manufacturer experiences an interruption of its business activities, the information in database 140 would be preserved. In embodiments, database 140 is independent accessible nationwide or worldwide using, for example, a mobile application used by emergency response or law enforcement personnel, enabling quick and efficient identification and rescue of lost pets. Database 140, in some embodiments, can be accessed through a secure web interface. Further, in embodiments, link 160 and link 170 may be communication links over the Internet. As such, communication with remote server 130 over links 160 and 170 can be established, respectively, by pet ID app 105 and pet ID tag 110 using a URL that identifies remote server 130.

Remote server 130 can receive from mobile computing device 101 a request to update information related to a pet. In embodiments, mobile computing device sends an update request to remote server 130 via link 160. An update request can be a request to update information relating to the pet, such as, for example, a change in owner contact information or updated photographs.

In exemplary embodiments, remote server 130 can receive health-oriented data from a pet ID tag, such as, for example, the pet's temperature, blood pressure, glucose level, and other health variables. Remote server 130, in embodiments, can include software that correlates these health variables with known disease parameters and, as a result, determine and store a preliminary diagnosis for the pet. For example, if a pet is presenting symptoms of the novel coronavirus (COVID-19) based upon health monitor readings taken by pet ID tag 110, then the health data corresponding to those symptoms can be transmitted to remote server 130, whereby remote server 130 can determine a COVID-19 diagnosis and associate this diagnosis with the pet. Further, when an animal's health readings return to normal, remote server 130 can receive health data that reflects the animal's improved condition, thereby altering the diagnosis to indicate the animal is presently healthy.

Further, remote server 130 can be configured to receive an indication of whether a pet ID tag has come within a predetermined proximity, for example, six feet, of another pet ID tag. For example, a pet ID tag 110 can detect when it is within six feet or less of another pet ID tag. When this occurs, pet ID tag 110 transmits, to remote server 130 over link 160, the identifier of its own pet ID tag and the identifier of the other, closely encountered pet ID tag. Remote server 130, in embodiments, can be configured to associate and track the pet ID tags that have come in close proximity to one another. If any of those pet ID tag identifiers is associated with a pet that has had a diagnosis of a contagious diseases (such as COVID-19), then the information associated with the pet ID tag is then updated as being a potential contact of the infected animal. This information can be periodically reviewed by pet control or health authorities in developing a contact tracing system for pets which would ultimately help community health. Authorities could analyze the contact data and contact the owners of all pets who have been determined to have come into contact with an infected animal. In embodiments, remote server 130 can be configured to automatically notify pet owners about potential infection of their pets because of close contact with a known infected animal.

Remote server 130 can also receive a request for information from mobile computing device 101. A request for information can include a unique identifier for a pet ID tag 110. In this case, remote server 130 accesses database 140 using the unique identifier as a key. Remote server 130 retrieves the information associated with the unique identifier and transmits this information (such as photographs, medical information, and owner contact information) to mobile computing device 101 for display on display 102.

Remote server 130 may be configured to receive information from pet ID tag 110 via link 170, as shown in FIG. 1. In embodiments, pet ID tag 110 transmits to remote server 130 data, such as ambient temperature, activity data, location data, whether the tag has been scanned, tapped, or photographed, and/or remaining battery life. Pet ID tag 110 also transmits its unique identifier (stored in NFC chip 114)

so that remote server 130 can identify the tag from which the data is coming from. Remote server 130 receives this data and, in exemplary embodiments, stores the data in database 140. In exemplary embodiments, remote server 130 is configured to determine whether the received data from pet ID tag 110 warrants sending an alert to mobile computing device 101 or to other third parties. Other third parties can include, without limitation, nearby pet shelters and law enforcement.

For example, remote server 130 may receive information that the ambient temperature of pet ID tag 110 exceeds 90° F., which might be determined to be unsafe for a pet. Remote server 130 may also receive location information from pet ID tag 110, providing the tag's geographic coordinates. Since these conditions may indicate that the pet is locked in a closed vehicle, remote server 110 may then send an alert message via link 160 to the pet's owner, who may be in possession of mobile computing device 101. Further, remote server 130 may send an alert with the tag's geographic coordinates to law enforcement, which enables law enforcement to respond and provide assistance to the pet. Other alert scenarios relating to location, activity, and battery conditions are possible and within the scope of the present invention. In exemplary embodiments, the alert sent by the remote server 130 may request a response within a predetermined time period (e.g., a certain number of seconds or minutes) to confirm that the alert was received or that some action will be taken in response to the alert. Further, in exemplary embodiments, if a response is not received within the predetermined time period, the remote server 130 may send the alert to a third party, such as a third party designated by the pet owner, so that prompt action may be taken in response to the alert.

Figures 2A, 2B, 2C:
FIG. 2A illustrates an exemplary mobile communication device that can be used in accordance with exemplary embodiments of the present invention.
FIGS. 2B and 2C illustrate an exemplary pet ID tag that can be used in accordance with exemplary embodiments of the present invention.

FIGS. 2A, 2B and 2C illustrates a system, generally designated by reference number 200, that includes an exemplary pet ID tag 210 (FIGS. 2A and 2C) and mobile communication device 201 (FIG. 2A) that can be used in accordance with exemplary embodiments of the present invention. As shown, mobile computing device 201 includes an exemplary pet identification application with a graphical user interface that includes functionality to access the location of pets that are wearing a pet ID tag. Further, mobile computing device 201 is configured to receive alerts and to manage lost alerts, which may have been transmitted while the device was turned off. The pet identification application running on mobile computing device 201 also allows an end user to add new pets, thereby providing the ability to manage multiple pet ID tags.

As shown, system 200 also includes a pet ID tag 210 having a front portion 210a and a back portion 210b. The back portion 210b includes a QR code, which has encoded the tag serial number. In exemplary embodiments, the tag serial number provides the unique identifier for the tag. The front portion 210a may be customizable by the pet owner to display information, such as, for example, the name of the pet, contact information, and a website associated with the pet ID tag.

Figures 3A, 3B:
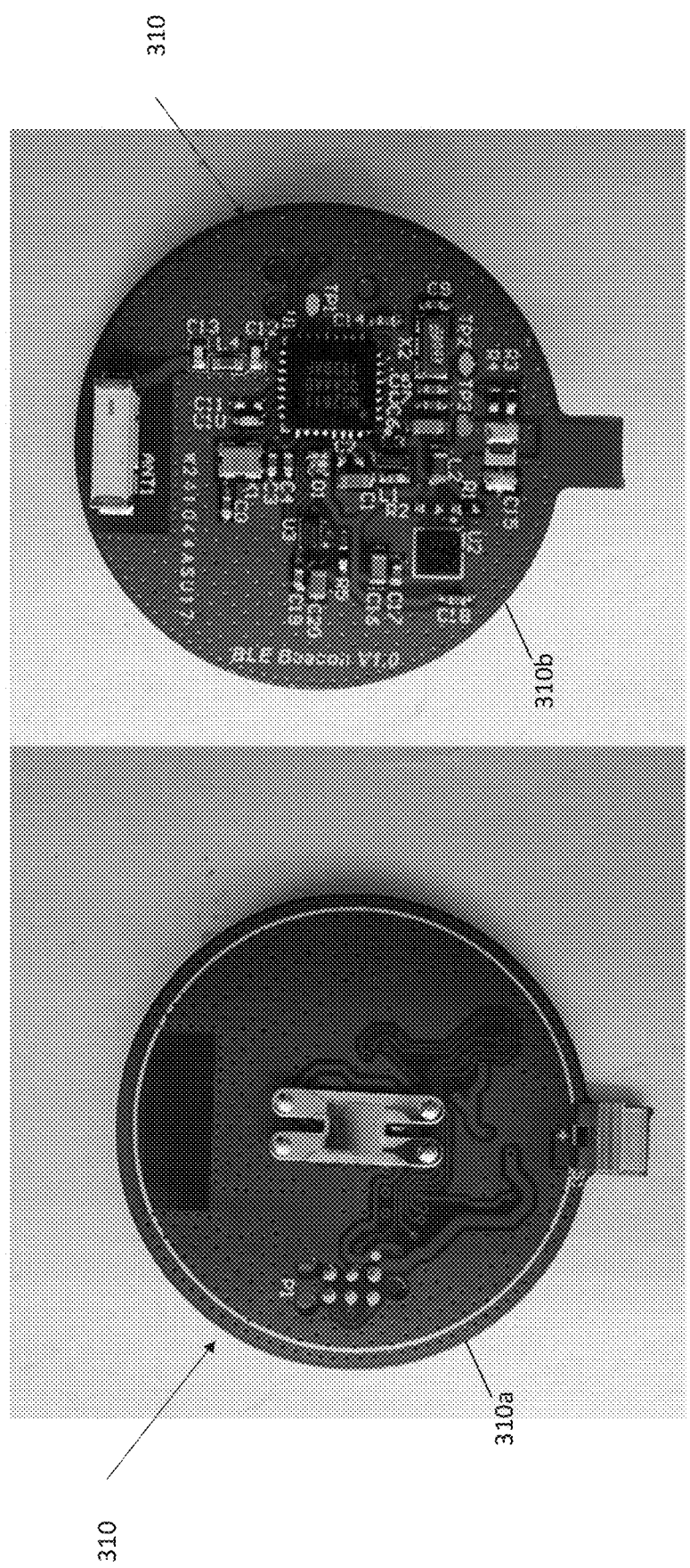
FIGS. 3A and 3B illustrates two views of an exemplary pet ID tag used in accordance with exemplary embodiments of the present invention.
Figure 4B:
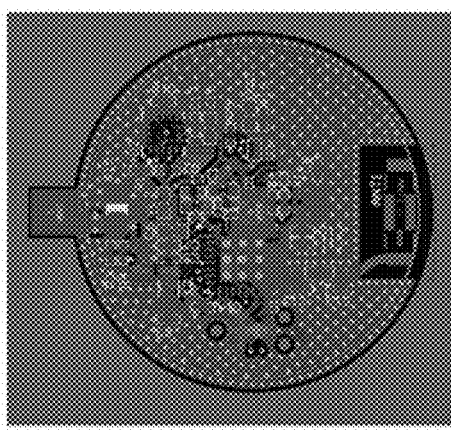
FIG. 4 illustrates electrical diagrams of exemplary pet ID tags in accordance with exemplary embodiments of the present invention.
Figure 4D:
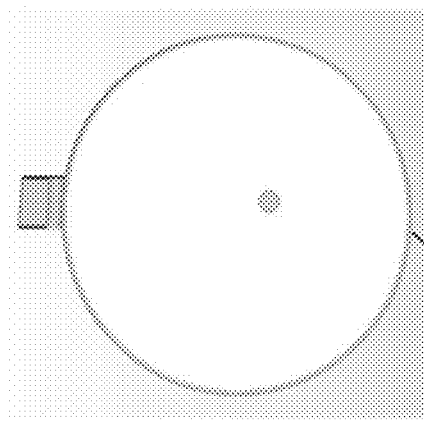
Figure 4A:
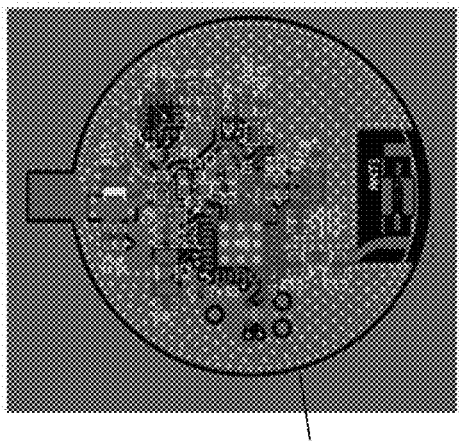
Figure 4C:
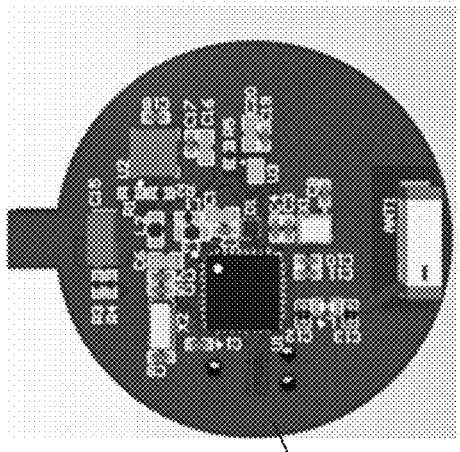

FIGS. 3A and 3B illustrate two views of a printed circuit board (PCB), designated by reference number 310, of a pet ID tag in accordance with exemplary embodiments of the present invention. The various modules depicted as enclosed within pet ID tag 110 in FIG. 1 are mounted on PCB 310. PCB 310 includes a top layer 310a and a bottom layer 310b. The various modules of the pet ID tag as described herein may be interconnected via the circuit board 310, and provide the functionality described in connection with pet ID tag 110 in FIG. 1.

As shown, top layer 310a of PCB 310 provides PCB 310 with immunity from electromagnetic interference by utilizing stitching to tie together copper from the top and bottom layers. Top layer 310a has configured thereon coin cell contacts and debug pads. Bottom layer 310b, as shown, includes Bluetooth circuitry, a ceramic antenna, and an on-board accelerometer.

FIG. 4 illustrates electrical diagrams of exemplary pet ID tags in accordance with exemplary embodiments of the present invention. FIG. 4A depicts a PCB top layer layout and placement 410a for a pet ID tag, according to an embodiment, where overall two distinct layers are used for the PCB. FIG. 4B also depicts a PCB bottom layer and placement 410b, which corresponds to top layer 410a. Further, FIG. 4C depicts a three-dimensional board view 410c, which corresponds to top layer 410a. Finally, FIG. 4D shows another three-dimensional board view 410d, which illustrates a coin cell connection.

Figure 5:
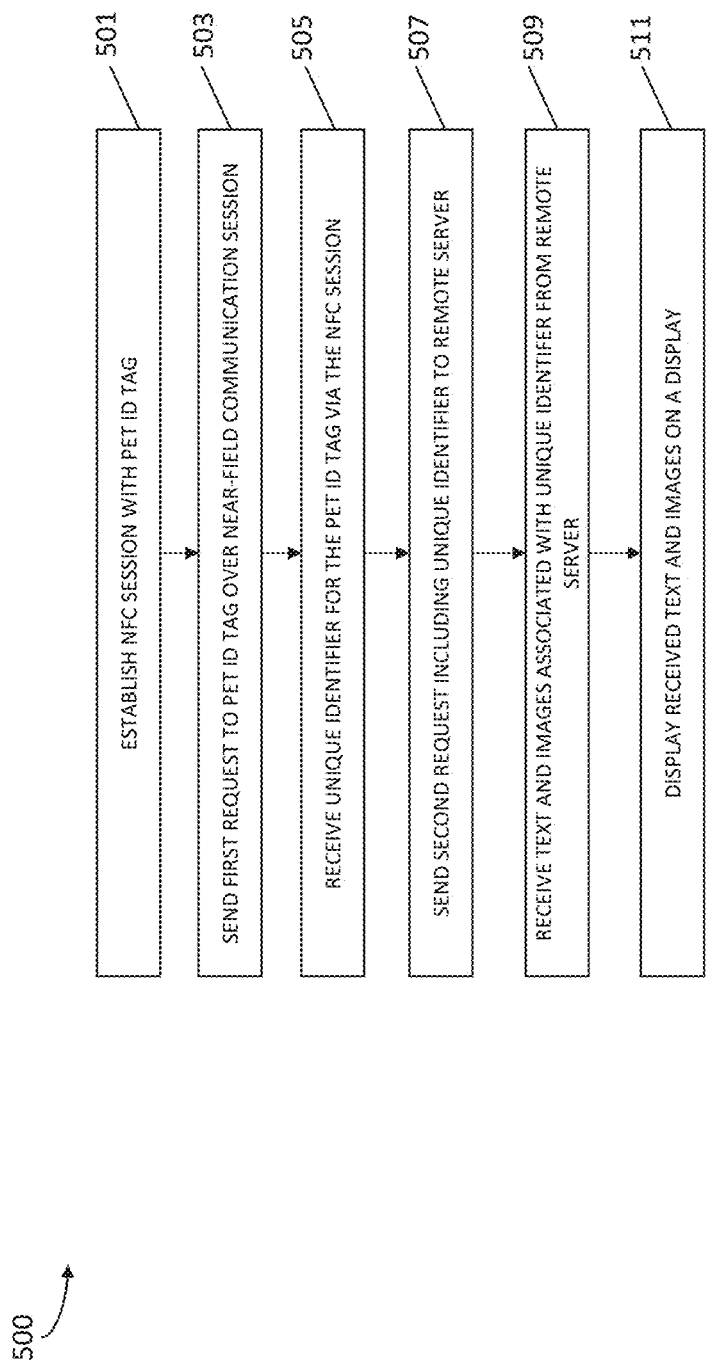
FIG. 5 is a flow diagram showing a process for a mobile communication device to communicate with a pet ID tag and obtain information associated with a pet wearing the tag, in accordance with exemplary embodiments of the present invention.

FIG. 5 is a flow diagram showing a method 500 for a mobile communication device to communicate with a pet ID tag and obtain information associated with a pet wearing the tag, in accordance with exemplary embodiments of the present invention. In exemplary embodiments, method 500 is carried out by a mobile computing device, such as mobile computing device 101 depicted in FIG. 1.

Method 500 begins at step 501. At step 501, mobile computing device 101 establishes an NFC session with pet ID tag 110. In exemplary embodiments, mobile computing device 101 pairs with pet ID tag 110 over a near field communication link, which, in exemplary embodiments, is no greater than 800 feet in distance. In exemplary embodiments, the session between the devices is established using Bluetooth, such as Bluetooth 5.0.

Next, at step 503, mobile computing device 101 transmits a first request to pet ID tag 110 over the established NFC session. The first request may include an identification request, whereby mobile computing device requests a unique identifier for pet ID tag 110. In exemplary embodiments, pet ID tag 110 receives the identification request and accesses NFC chip 114 to provide the unique identifier.

At step 505, mobile computing device 101 receives a unique identifier for pet ID tag 110 via the NFC session. According to exemplary embodiments, the unique identifier can be a serial number that is encoded and stored within NFC chip 114 of pet ID tag 110. In other exemplary embodiments, mobile computing device 101 can receive the unique identifier by photographing and deciphering the identifier from a QR pictogram printed on pet ID tag 110. In this case, method 500 would not require the establishment of an NFC session between mobile computing device 101 and pet ID tag 110.

At step 507, mobile computing device 101 sends a second request including the unique identifier of pet ID tag 110 to remote server 130. In exemplary embodiments, mobile computing device 101 sends the second request over a WiFi or cellular data link via the Internet, as described in connection with link 160 in FIG. 1. Remote server 130 is configured to receive the request and to retrieve text and image data associated with the unique identifier of pet ID tag 110. According to exemplary embodiments, the second request need not include a password to request text and image data associated with the unique identifier of the tag. Alternatively, the remote server 130 may require input of a password before information can be provided to the mobile computing device 101. In this regard, a user may make a specific request for information through an application program, such as pet ID app 105.

Next, at step 509, mobile computing device 101 receives text and images associated with the unique identifier pet ID tag 110 from remote server 130. In exemplary embodiments, the text and images can include, for example, pet photographs, medical data pertaining to a pet, and owner identification information. Mobile computing device 101 receives the information from remote server 130 via link 160.

Finally, at step 511, mobile computing device 101 displays the received text and images on a display device. In exemplary embodiments, mobile computing device 101 invokes an application program, such as pet ID app 105 in FIG. 1, which displays the information on display 102. In embodiments, the text and information displayed on display 102 includes contact information for the owner of the pet wearing pet ID tag 110. In such embodiments, mobile computing device displays the contact information in a manner whereby an end user can click or touch the contact information in order to place a call to one or more owners of the pet. Moreover, in embodiments, mobile computing device can receive (at step 509) multiple contacts corresponding to the pet wearing pet ID tag 110, such as friends, family members, and medical personnel. In such embodiments, at step 511, mobile computing device 101 displays a list of contacts corresponding to the pet. Each contact can be displayed so that, when the displayed contact is clicked or touched by an end user of mobile computing device 101, a call is automatically placed to the selected contact.

Figure 6:
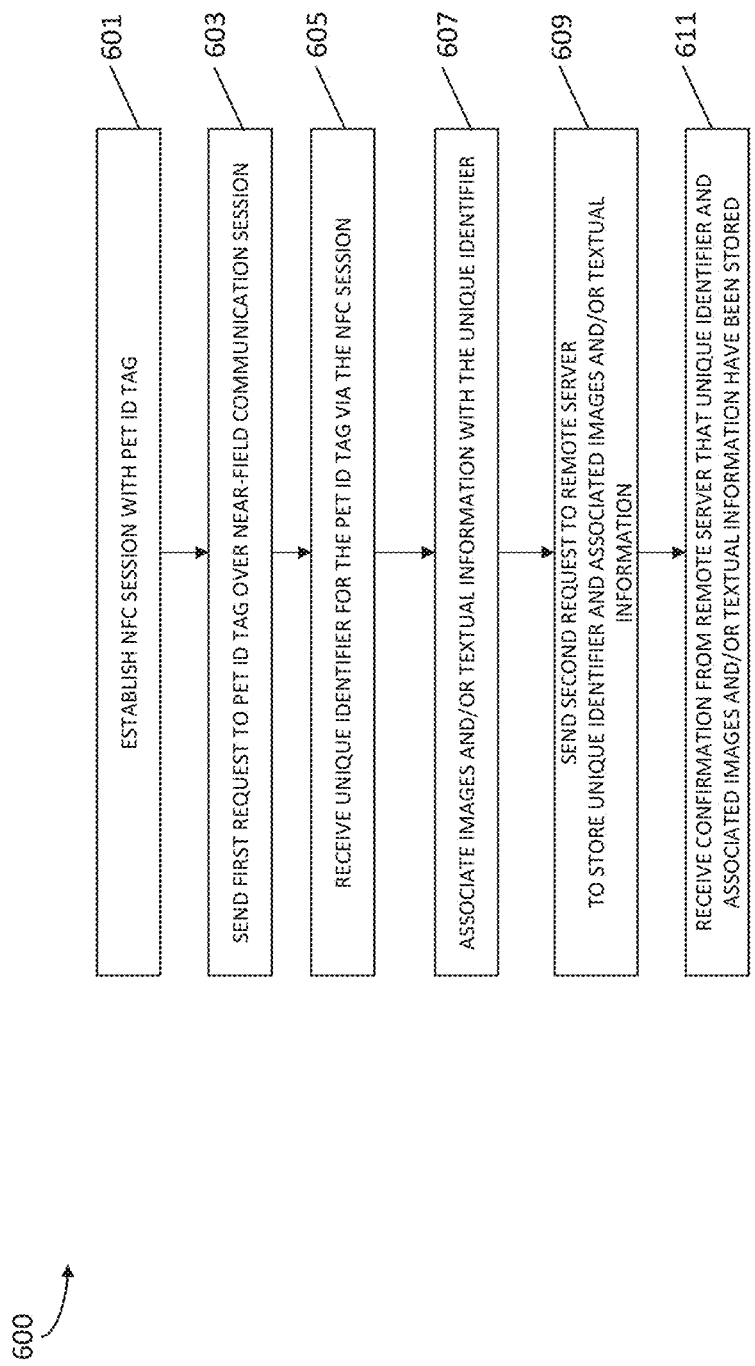
FIG. 6 is a flow diagram showing a process for a mobile communication device to communicate with a pet ID tag and to remotely store information associated with a pet wearing the tag, in accordance with exemplary embodiments of the present invention.

FIG. 6 is a flow diagram showing a method 600 for a mobile communication device to communicate with a pet ID tag and to remotely store information associated with a pet wearing the tag, in accordance with exemplary embodiments of the present invention. In exemplary embodiments, method 600 is carried out by a mobile computing device, such as mobile computing device 101 depicted in FIG. 1.

Method 600 begins at step 601. At step 601, mobile computing device 101 establishes an NFC session with pet ID tag 110. In exemplary embodiments, mobile computing device 101 pairs with pet ID tag 110 over a near field communication link, which, in exemplary embodiments, is no greater than 800 feet in distance. In exemplary embodiments, the session between the devices is established using Bluetooth, such as Bluetooth 5.0.

Next, at step 603, mobile computing device 101 transmits a first request to pet ID tag 110 over the established NFC session. The first request may include an identification request, whereby mobile computing device requests a unique identifier for pet ID tag 110. In exemplary embodiments, pet ID tag 110 receives the identification request and accesses NFC chip 114 to provide the unique identifier.

At step 605, mobile computing device 101 receives a unique identifier for pet ID tag 110 via the NFC session. According to exemplary embodiments, the unique identifier includes a serial number that is encoded and stored within NFC chip 114 of pet ID tag 110. In other exemplary embodiments, mobile computing device 101 can receive the unique identifier by photographing and deciphering the identifier from a QR pictogram printed on pet ID tag 110. In this case, method 600 would not require the establishment of an NFC session between mobile computing device 101 and pet ID tag 110.

Next, at step 607, mobile computing device 101 associates images and/or text information with the received unique identifier for pet ID tab 110. In exemplary embodiments, mobile computing device 101 may execute computer readable instructions that generate a second request, where the second request includes the unique identifier and data fields that store or point to text and image data. The text and images may correspond to a pet wearing pet ID tag 110. Such data may include updated photographs of a pet, updated owner contact information, or medical data for the pet, such as, for example, a vaccination schedule. In exemplary embodiments, a user may input updated information associated with the unique identifier through an application program, such as pet ID app 105.

Once the text and image data has been associated with the unique identifier, method 600 proceeds to step 609. At step 609, mobile computing device 101 sends a third request to remote server 130. According to exemplary embodiments, the third request includes instructions to store the unique identifier for pet ID tag 110 along with the associated text and image data. Upon receipt of the third request, remote server 130 may store the received unique identifier and associated text and image data in a database, such as database 140. As shown in FIG. 1, mobile computing device 101 may send the third request over the Internet via a WiFi or cellular data link such as link 160.

At step 611, mobile computing device 101 receives a confirmation from remote server 130 that the unique identifier and associated image and text information has been stored. In exemplary embodiments, mobile computing device 101 receives the confirmation over link 160.

Figure 7:
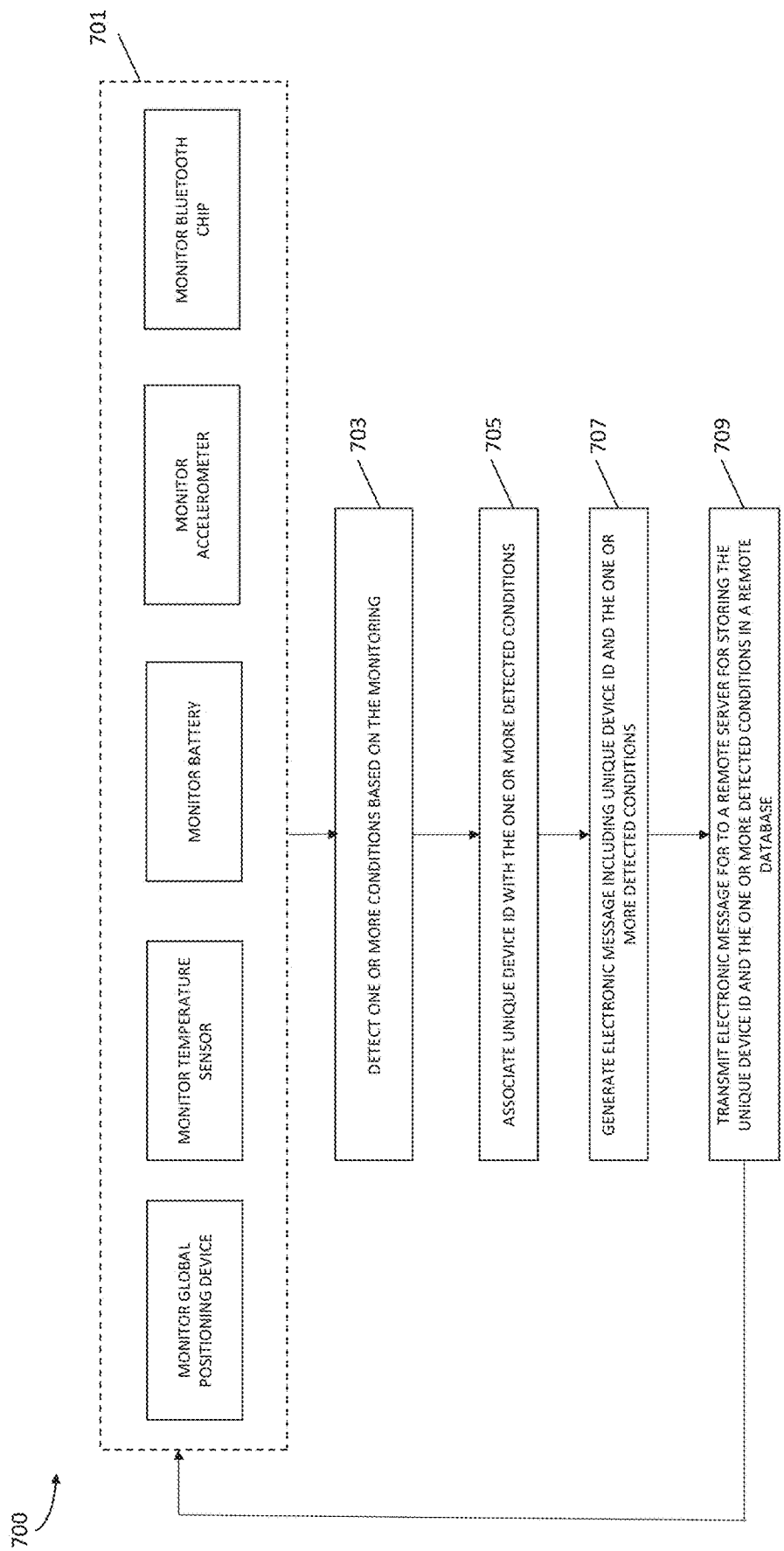
FIG. 7 is a flow diagram showing a process for a pet ID tag to detect and record one or more conditions associated with the tag, in accordance with exemplary embodiments of the present invention.

FIG. 7 is a flow diagram showing a method 700 for a pet ID tag to detect and record one or more conditions associated with the tag, in accordance with exemplary embodiments of the present invention. In exemplary embodiments, method 700 is carried out by a processor of a pet ID tag, such as pet ID tag 110 depicted in FIG. 1, executing computer readable instructions.

Method 700 begins at step 701. At step 701, pet ID tag 110, via processor 111, monitors for several conditions, either concurrently or serially. For example, as shown in FIG. 7, pet ID tag 110 monitors a global positioning device, such as GPS 122. In exemplary embodiments, pet ID tag 110 monitors GPS 122 to determine whether the location of pet ID tag 110 is greater than a predetermined distance away from a home base or some other location, thus aiding in determining whether a pet has strayed from home or from some other location. In embodiments, pet ID tag 110 is configured to store a perimeter radius surrounding a predetermined geographic coordinate location. In such cases, processor 111 utilizes GPS 122 to determine if pet ID tag 110's current location is beyond the perimeter radius. In this way, pet ID tag 110 provides for a virtual fence around any predetermined geographic coordinate.

Also shown in FIG. 7, pet ID tag 110 monitors a temperature sensor, such as temperature sensor 115. In embodiments, pet ID tag 110 monitors temperature sensor 115 to determine whether the ambient temperature of the tag exceeds or falls below a threshold value. This aids in determining whether the pet wearing the tag is, for example, locked in a hot enclosed vehicle or being restrained outside in winter.

Further, pet ID tag 110 may monitor an on-board battery, such as battery 117 in FIG. 1. In embodiments, pet ID tag 110 may monitor battery 117 to determine the amount of charge left in the battery and how much more time it will take for the battery to drain.

In addition, as shown in FIG. 7, pet ID tag 110 may also monitor an accelerometer, such as accelerometer 116 in FIG. 1. In embodiments, pet ID tag 110 may monitor accelerometer 116 to determine the accelerations and movements of the pet wearing the tag. Pet ID tag 110 may determine whether activity, or a lack of activity, shown by the accelerometer is unusual. For example, if a pet is known to be housed in a small apartment, pet ID tag 110 may determine that excessive running and/or jumping is unusual for such an environment. By contrast, if a pet is normally very active, pet ID tag 110 may determine that very little recent activity is unusual and may indicate illness of the pet.

Pet ID tag 110 may also monitor an on-board Bluetooth chip, such as Bluetooth chip 113 depicted in FIG. 1. In exemplary embodiments, pet ID tag 110, via processor 111, may monitor Bluetooth chip 113 to determine whether the pet ID tag 110 has been scanned by a mobile computing device. This information can be used to further determine whether a pet has been interacting with strangers. Further, pet ID tag 110, via processor 111, may monitor whether it has come into physical proximity with another pet ID tag, which, as described above, can be important in developing contact tracing for interactions with infected animals.

Next, at step 703, pet ID tag 110 detects one or more conditions based upon the monitoring performed in step 701. As noted above, pet ID tag 110 may determine that an ambient temperature of the tag exceeds or falls below certain temperature thresholds. Or, as another example, pet ID tag 110 may determine that the global position of the tag indicates that the pet wearing the tag has strayed from home.

Next, at step 705, pet ID tag 110 associates a unique identifier for the tag with the one or more detected conditions. In exemplary embodiments, pet ID tag 110 retrieves a unique tag identifier, or serial number, from NFC chip 116. This unique identifier is associated in memory (e.g., RAM 112) with the one or more detected conditions in preparation for generating an electronic message to send to a remote server.

At step 707, pet ID tag 110 generates an electronic message that includes the unique tag identifier and the one or more detected conditions. In exemplary embodiments, the electronic message is constructed as one or more data records or packets that logically associate the unique identifier for the tag with data that corresponds to or describes the detected conditions. For example, if the unique identifier for a tag is denoted by the numerical sequence 1111, then pet ID tag 110 generates an electronic message that associates the numerical sequence 1111 with data that describes conditions detected at step 703. For example, if pet ID tag 110 detects an ambient temperature of greater than 90° F., then the generated electronic message would associate the number 1111 with an appropriate message, such as "temperature too high," along with the temperature detected. It should be noted that there are numerous ways the electronic message can be generated to associate the unique identifier with the detected condition information which are within the scope of the present invention.

Lastly, at step 709, pet ID tag 110 transmits the generated electronic message to a remote server, such as remote server 130, for storage in a remote database, such as database 140. In exemplary embodiments pet ID tag 110 transmits the message over a WiFi or cellular link, such as link 170 in FIG. 1. Upon receipt of the message, remote server 130 stores the unique tag identifier, along with the detected condition information, in database 140. Remote server 130 may then transmit an alert to one or more mobile devices, or to one or more public authorities, which describes the detected condition.

It should also be noted that, in embodiments, remote server 130 can also perform certain predictive analytics related to the received condition information. In embodiments, remote server 130 processes the condition information to predict future behavioral results for the pet wearing pet ID tag 110. For example, remote server 130 may correlate pet activity with time of day, location, and ambient temperature in order assist owners in determining optimal strategies to achieve desired pet behavior.

In some embodiments, pet ID tag 110 may also transmit a message, via a Bluetooth or other near field communication link, to a smart home security system (not shown). Such a smart home security system can then notify a homeowner of a potentially dangerous condition. For example, pet ID tag 110, via processor 111, may detect excessive barking or unusual activity from monitoring accelerometer 116. In such a case, pet ID tag 110 may transmit a message via Bluetooth link from via wireless transceiver 123 and antenna 119 to a home security system to alert the homeowner of the condition.

In some embodiments, pet ID tag 110 may transmit a message to remote server 130 that reflects a mode of communication by the animal wearing the tag. For example, when a dog senses a stranger or unfamiliar animal roaming near the owner's property, the dog will bark or move in a certain pattern. Sensors (such as accelerometer 116, GPS 122, and/or temperature sensor 115) can detect changes that correspond to excessive barking or anxious movements by the pet and send that data to remote server 130.

Further, in embodiments, remote server 130 may be configured to run artificial intelligence or machine learning algorithms to learn, over time, a pet's individual habits based on the data received from pet ID tag 110. For example, remote server 130 may be configured to learn that a certain pattern of movement (acceleration), location, and temperature detected by pet ID tag 110 corresponds to a situation in which the pet is alarmed. In such a case, remote server 130 can be configured to communicate with a home alarm system over a network communication path (such as the Internet of Things), instructing the home alarm system to perform preventive activities, such as, for example, turning lights on and off, or emitting loud alarm or vocal sounds.

After step 709, method 700 returns to step 701, where pet ID tag 110 returns to monitoring for various conditions, as described above.

Figure 8:
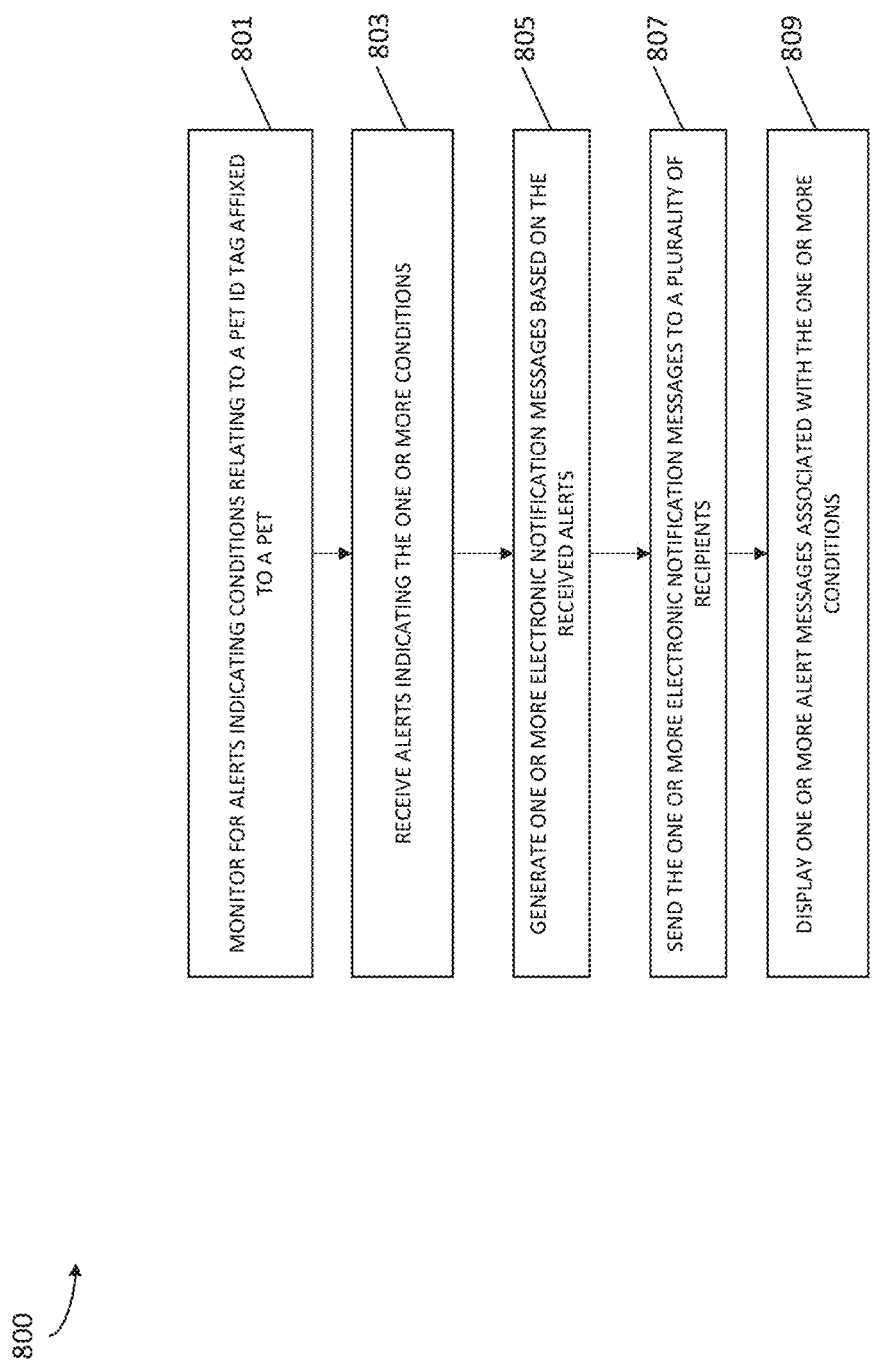
FIG. 8 is a flow diagram showing a process for a mobile communication device to receive alerts associated with one or more conditions associated with a pet ID tag, in accordance with exemplary embodiments of the present invention.

FIG. 8 is a flow diagram of a method 800 for a mobile communication device to receive alerts associated with one or more conditions associated with a pet ID tag, in accordance with exemplary embodiments of the present invention. Method 800 is carried out, in exemplary embodiments, by a mobile computing device, such as mobile computing device 101 depicted in FIG. 1.

Method 800 begins at step 801. At step 801, mobile computing device 101 monitors a network link, such as link 160, for alerts that indicate conditions relating to a pet ID tag, such as pet ID tag 110. At step 803, mobile computing device 101 receives one or more alerts over link 160 from remote server 130. In exemplary embodiments, the received alerts indicate that a particular pet ID tag, such as pet ID tag 110, has associated with it one or more dangerous conditions. For example, the alerts may indicate that the ambient temperature of the tag is either above or below a predetermined temperature threshold. Further, the alerts may indicate that the pet ID tag's location is more than a predetermined distance away from a home base location.

In addition to alerts pertaining to potentially dangerous conditions, alerts may also be received to remind a pet owner of certain tasks and deadlines. For example, an alert can be received which reminds a pet owner that it is time to take the pet for a check-up at a veterinarian. Further, an alert can be received which reminds the pet owner to reorder or administer certain medications to the pet. In addition, an alert can be received which informs the pet owner that his or her pet has come into close physical proximity with an animal that has been diagnosed (either automatically due to saved health data, or by a veterinarian) with one or more contagious diseases.

At step 805, mobile computing device 101 may generate one or more electronic notification messages based on the received alerts. At step 807, mobile computing device 101 may send the one or more electronic notification messages to a plurality of recipients. For example, if mobile computing device 101 receives an alert that indicates that a pet is lost, then, at step 807, the mobile computing device may send electronic notification messages to one or more law enforcement recipients, or to one or more animal shelters that are close to the pet's last known location. These electronic notifications provide instructions to these public authorities to be on the lookout for a lost pet. According to embodiments, notifications can be sent by mobile computing device 101 to recipients that members of the First Responder Network Authority (FirstNet). As another example, if mobile computing device 101 receives an alert indicating that the ambient temperature of pet ID tag 110 exceeds a threshold (indicating, for example, that the pet is trapped in a locked car), then the device may send an electronic notification to law enforcement, providing the geographic coordinates of the tag. This enables law enforcement to quickly locate and rescue the pet. Further, in embodiments, if pet ID tag 110 is scanned or tapped by a mobile device (such as another smartphone), mobile computing device 101 may receive location information that indicates the current location of the pet wearing the tag.

At step 809, mobile computing device 101 may display one or more of the received alert messages on a display device, such as display 102 depicted in FIG. 1. According to exemplary embodiments, the alert message can indicate a dangerous condition associated with the pet wearing a pet ID tag 110. Alternatively, the alert can be a reminder of an upcoming medical appointment for the pet.

Pets may communicate with their owners (and others) in many ways. In this regard, in various exemplary embodiments, artificial intelligence and predictive analytics may be applied to the pet ID tag and associated systems and methods to help interpret these non-verbal signals. In exemplary embodiments, the inventive Bluetooth enabled smart-tags may have onboard data processing capabilities, and transfer data over the cellular network without any human interaction. This data may be utilized to help personalize each user's experience. Predictive analytics and artificial intelligence may be applied to obtain the desired behavioral results.

Figure 9:
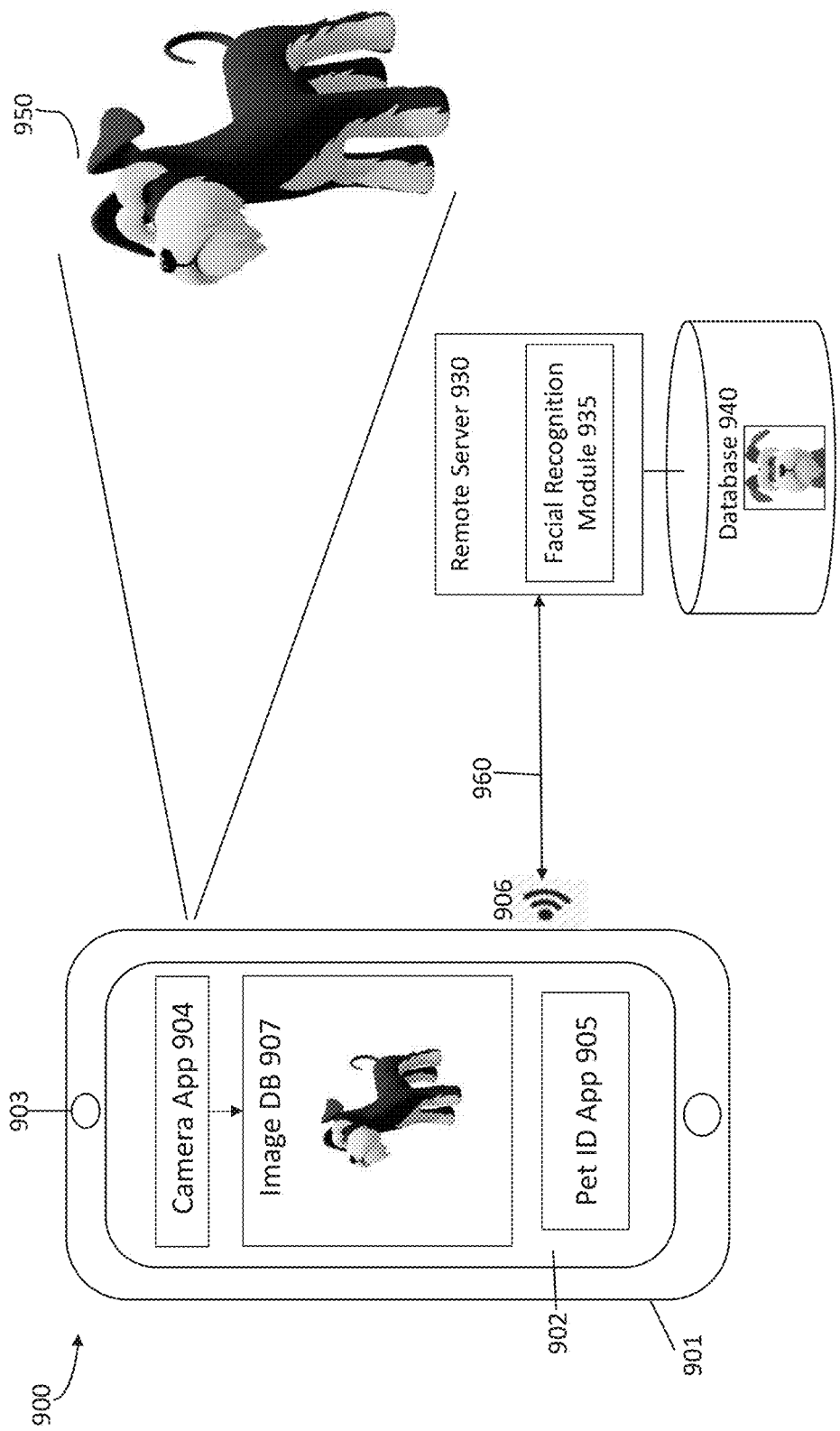
FIG. 9 illustrates an exemplary pet identification system that makes use of facial recognition technology, in accordance with exemplary embodiments of the present invention.

FIG. 9 is a block diagram that illustrates a system, generally designated by reference number 900, in accordance with an exemplary embodiment of the present invention. The system 900 includes a mobile computing device 901 and a remote server 930 operatively coupled to a database 940.

As with mobile device 101 of FIG. 1, mobile device 901 includes a display 902, a camera 903, and a camera app 904. These components provide similar functionality as corresponding components 102, 103, and 104, respectively, described above in connection with FIG. 1. Further, mobile device 901 also executes Pet ID app 905.

As with Pet ID app 105 of FIG. 1, Pet ID app 905 is an application program that an end user interacts with through display 902. In embodiments, pet ID app 905 includes all the functionality described in connection with pet ID app 105.

In exemplary embodiments, pet ID app 905 is an application program that is configured to provide an end user with the capability of determining the identity and associated information of a pet based on a photograph of the pet. Pet ID app 905 is configured to access an image database on mobile device 901, such as image database 907. As shown, an end user may use camera app 904 to take a photograph, using camera 903, of a stray pet, such as the pet 950 depicted in FIG. 9. Once a photograph of pet 950 is taken, the image of the pet can be stored locally in image database 907 via camera app 904.

Pet ID app 905 can be used by an end user to communicate, via link 960, to a remote server (such as remote server 930) to obtain information relating to the pet in a stored photograph. Pet ID app 905 is configured to transmit, via wireless network adapter 906, one or more pet photographs over link 960, along with an associated data request relating to the pets in the transmitted photographs. Further, Pet ID app 905 is configured to receive a response to the data request and display information received from remote server 930. In embodiments, like pet ID app 105 in FIG. 1, pet ID app 905 may communicate over line 960 using a Uniform Resource Locater (URL) for remote server 930.

As shown in FIG. 9, system 900 also includes remote server 930. In exemplary embodiments, remote server 930 can be a desktop computer, a laptop computer, a tablet, a smartphone, or any server quality computer. Remote server 930 is configured to communicate over a wide area or local area network. As shown, remote server 930 communicates over link 960. Link 960 is a communication link between remote server 930 and mobile computing device 901. In embodiments, remote server 930 is configured to receive and respond to requests from mobile computing device 901. As shown in FIG. 9, remote server 930 is operatively connected to database 940. According to exemplary embodiments, database 940 associates digital photographs of pets with corresponding information. In exemplary embodiments, database 940 may be a relational database, a hierarchical database, or a structured text file. In embodiments, database 940 is a centralized, globally accessible database that is public and non-proprietary. That is, database 940 may be configured to be queried separately from a device other than mobile device 901. For example, in embodiments, database 940 can be configured to be accessed, updated, and queried through a web interface that is accessible to the public and/or to animal control authorities. In some embodiments, database 940 is configured to be deployed in a cloud computing environment. In embodiments, database 940 is independently accessible nationwide or worldwide using, for example, a mobile application used by emergency response and/or law enforcement personnel, enabling quick and efficient identification and rescue of lost pets. Database 940, in some embodiments, can be accessed through a secure web interface. Further, in embodiments, link 960 may be a communication link over the Internet. As such, communication with remote server 930 over link 960 can be established by pet ID app 905 using a URL that identifies remote server 930.

According to exemplary embodiments, remote server 930 can receive a request for information from mobile computing device 901. A request for information can include a digital photograph of a stray pet. Upon receipt of the request and digital photograph, remote server 930 invokes facial recognition module 935. Facial recognition module 935 is a software module executed by remote server 930. Facial recognition module 935 is configured to read in a digital photograph and select facial features of the photograph in accordance with techniques known in the art. After analyzing and selecting facial features, facial recognition module 935 accesses database 940. Database 940 stores facial images of previously registered pets and associates those images with information corresponding to the pet depicted in the image. Facial recognition module 935 compares features in the received photograph with features in images stored in database 940. If there is a match between the facial image in the received photograph and the image in the database, then remote server 930 retrieves information associated with the image and transmits this information (such as other photographs, medical information, and owner contact information) to mobile computing device 901 for display on display 902.

In exemplary embodiments, the facial recognition module 935 may employ facial recognition algorithms such as, for example, principal component analysis using eigenfaces, linear discriminant analysis, elastic bunch graph matching using the Fisherface algorithm, the hidden Markov model, the multilinear subspace learning using tensor representation, the neuronal motivated dynamic link matching and combinations thereof, to name a few.

Figure 13:
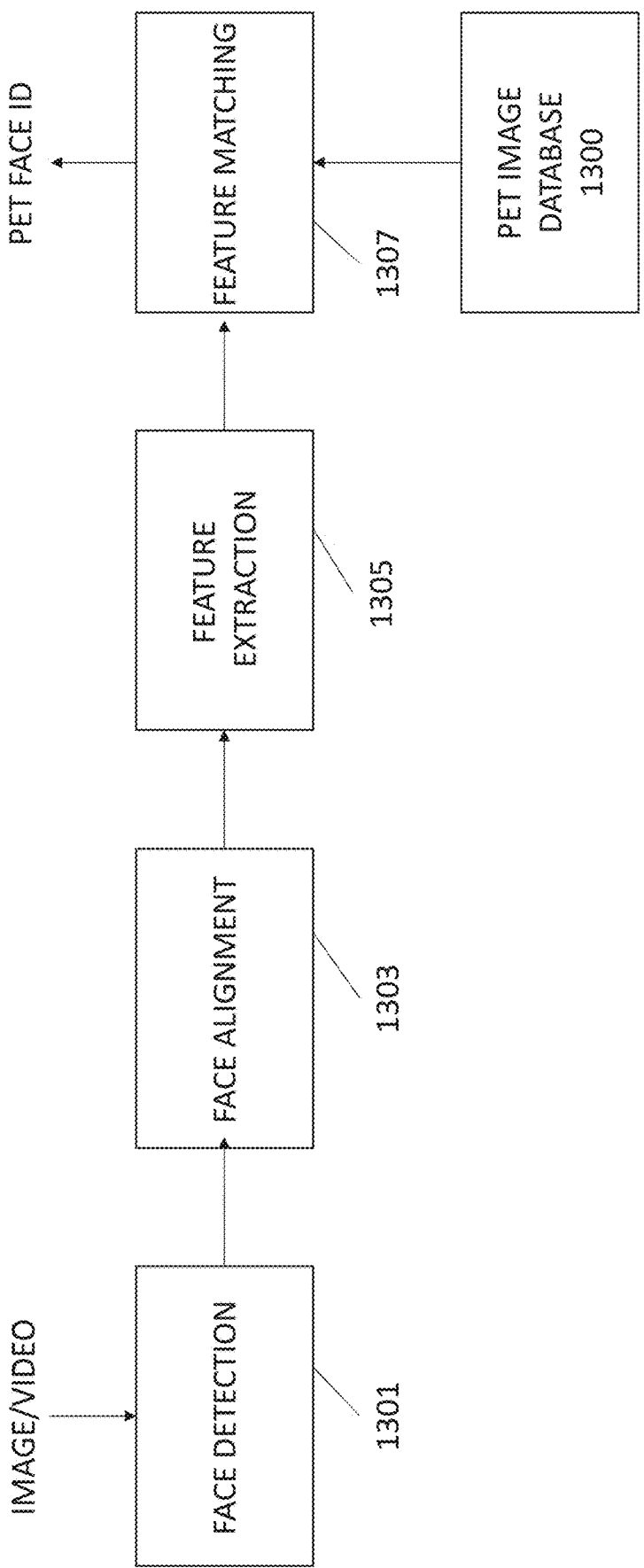
FIG. 13 is a flowchart illustrating a pet facial recognition algorithm according to an exemplary embodiment of the present invention.

FIG. 13 is a flowchart illustrating a pet facial recognition algorithm, generally designated by reference number 1300, according to an exemplary embodiment of the present invention. The process 1300 includes a face detection step 1301, a face alignment step 1303, a feature extraction step 1305 and a face recognition step 1307. The face detection step 1301 may involve location of one or more pet faces in a received image or video and marking the located pet faces with a bounding box. The face detection step 1301 may invoke face detection methods such as, for example, feature-based detection and image-based detection using deep learning, to name a few. The output of the face detection step 1301 may include face location, face size, and/or face pose, to name a few. The face alignment step 1303 may include normalization of detected face or faces to be consistent with images in the database 940, such as geometry and photometrics. The feature extraction step 1305 involves extraction of features from the face or faces to produce a feature vector that can be used for the recognition task. The face recognition step 1307 includes matching of the face against one or more known faces in a prepared database, such as the database 940. The matching algorithm may seek an exact match and/or may seek an image that is similar to the input image. In exemplary embodiments, the face recognition step 1307 may generate anew face that is similar to the input face for inclusion in the database 940. This may be particularly useful if no match is found, either exact or similar, in case the pet of interest is found again at a later point in time.

Further, in embodiments, remote server 930 may be configured to run artificial intelligence or machine learning algorithms to learn, over time, whether a facial image and/or iris image corresponds to a lost pet without requiring the comparison of the facial image or iris image to a registered image. For example, remote server 930 may be configured to learn that a certain facial expression is more common for lost pets than for pets that have not strayed. For example, remote server 930 may, in embodiments, learn that pets that have strayed from their owners and homes have a certain "distressed" expression, which indicates that the pet is either lost, sick, or otherwise having difficulty. In such embodiments, remote server 930 may generate an alert to pet control authorities to call for assistance to help reunite the pet with its owner, or to provide aid. Such an alert would include the received facial image of the distressed pet.

Figure 10:
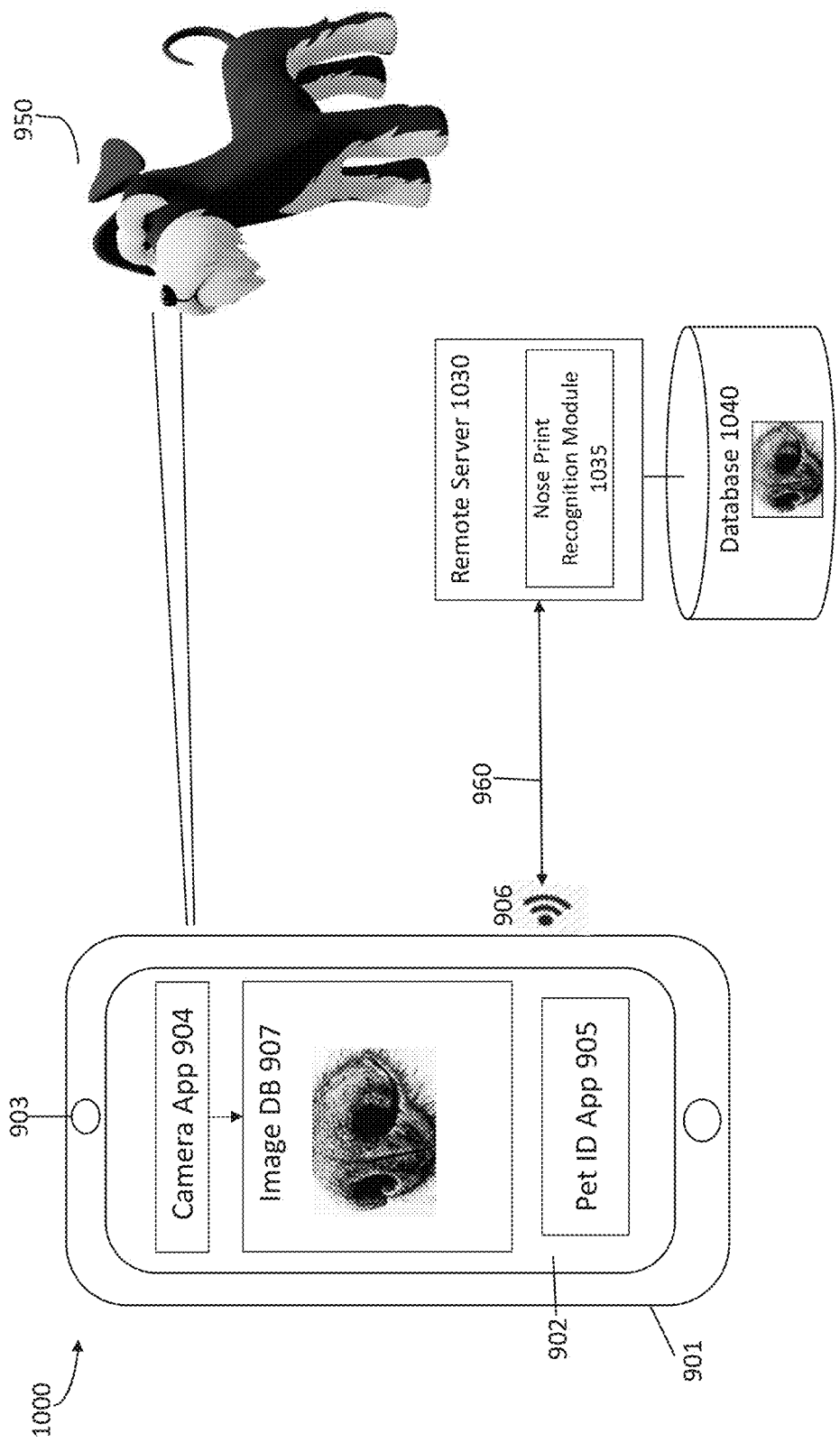
FIG. 10 illustrates an exemplary pet identification system that makes use of nose print recognition technology, in accordance with exemplary embodiments of the present invention.

FIG. 10 is a block diagram that illustrates a system, generally designated by reference number 1000, in accordance with an exemplary embodiment of the present invention. The system 1000 includes a mobile computing device 901 and a remote server 1030 operatively coupled to a database 1040.

According to exemplary embodiments, mobile device 901 is functionally equivalent to the mobile device depicted in FIG. 9, which includes a display 902, a camera 903, and a camera app 904. As mentioned previously, these components provide similar functionality as corresponding components 102, 103, and 104, respectively, described above in connection with FIG. 1. Further, mobile device 901 also executes Pet ID app 905.

Further, as explained above, Pet ID app 905 is an application program that an end user interacts with through display 902. In embodiments, Pet ID app 905 includes all the functionality described in connection with Pet ID app 105.

As explained in connection with FIG. 9, according to exemplary embodiments, pet ID app 905 is an application program that is configured to provide an end user with the capability of determining the identity and associated information of a pet based on a photograph of the pet. Specifically, Pet ID app 905 is configured to access an image database on mobile device 901, such as image database 907. As shown, an end user may use camera app 904 to take a zoomed photograph, using camera 903, of the nose of a stray pet, such as the pet 950 depicted in FIG. 10. In embodiments of the present invention, the nose print of an animal, such as a stray dog, can be used to uniquely identify the animal, much as a fingerprint can be used to uniquely identify a human. Once a photograph of the nose of pet 950 is taken, the nose print image of the pet can be stored locally in image database 907 via camera app 904.

As an alternative to a zoomed photograph of a stray pet's nose, in exemplary embodiments, an end user may use camera app 904 to instead take a zoomed photograph of the one or both of the stray pet's irises. As is the case for nose prints, the irises of an animal can uniquely identify a pet because it is nearly impossible for two different animals to have the same iris pattern.

As described in connection with FIG. 9, Pet ID app 905 can be used by an end user to communicate, via link 960, to a remote server (such as remote server 1030) to obtain information relating to the nose print of the pet depicted in a stored photograph. Pet ID app 905 is configured to transmit, via wireless network adapter 906, one or more pet nose print photographs over link 960, along with an associated data request relating to the nose prints in the transmitted photographs. Further, Pet ID app 905 is configured to receive a response to the data request and display information received from remote server 1030. In embodiments, like pet ID app 105 in FIG. 1, pet ID app 905 may communicate over line 960 using a Uniform Resource Locater (URL) for remote server 1030.

As shown in FIG. 9, system 1000 also includes remote server 1030. In exemplary embodiments, remote server 1030 can be a desktop computer, a laptop computer, a tablet, a smartphone, or any server quality computer. Remote server 1030 is configured to communicate over a wide area or local area network. As shown, remote server 1030 communicates over link 960. Link 960 is a communication link between remote server 1030 and mobile computing device 901. In embodiments, like remote server 930 in FIG. 1, remote server 1030 is configured to receive and respond to requests from mobile computing device 901. As shown in FIG. 9, remote server 1030 is operatively connected to database 1040.

According to exemplary embodiments, database 940 associates digital photographs of nose prints of pets with corresponding information. In exemplary embodiments, database 1040 may be a relational database, a hierarchical database, or a structured text file. In embodiments, database 1040 is a centralized, globally accessible database that is public and non-proprietary. That is, database 1040 may be configured to be queried separately from a device other than mobile device 901. For example, in embodiments, database 1040 can be configured to be accessed, updated, and queried through a web interface that is accessible to the public or to animal control authorities. In some embodiments, database 1040 is configured to be deployed in a cloud computing environment. In embodiments, database 1040 is independently accessible nationwide or worldwide using, for example, a mobile application used by emergency response or law enforcement personnel, enabling quick and efficient identification and rescue of lost pets. Database 1040, in some embodiments, can be accessed through a secure web interface. Further, in embodiments, link 960 may be a communication link over the Internet. As such, communication with remote server 1030 over link 960 can be established by pet ID app 905 using a URL that identifies remote server 1030.

According to exemplary embodiments, remote server 1030 can receive a request for information from mobile computing device 901. A request for information can include a zoomed digital photograph of the nose of a stray pet. Upon receipt of the request and digital photograph, remote server 1030 invokes nose print recognition module 1035. Nose print recognition module 1035 is a software module executed by remote server 1030. Nose print recognition module 1035 is configured to read in a digital photograph of the nose or nose print of an animal, and to select certain nose print features of the photograph in accordance with techniques known in the art. After analyzing and selecting nose print features from the received photograph, nose print recognition module 1035 accesses database 1040. Similar to database 940, database 1040 stores images of the nose prints of previously registered pets and associates those nose print images with information corresponding to the pet depicted in the image. Nose print recognition module 1035 compares nose print features in the received photograph with nose print features in images stored in database 1040. If there is a match between the nose print image in the received photograph and any of the nose print images in the database, then remote server 1030 retrieves information associated with the nose print image and transmits this information (such as pet photographs, medical information, and owner contact information) to mobile computing device 901 for display on display 902.

In exemplary embodiments, the nose print recognition module 1035 may employ pattern recognition algorithms such as, for example, classification methods, clustering methods, ensemble learning algorithms, Bayesian networks, Markov random fields, multilinear subspace learning algorithms, real-valued sequence labeling methods, regressions methods, sequence labeling methods and combinations thereof, to name a few.

Figure 14:
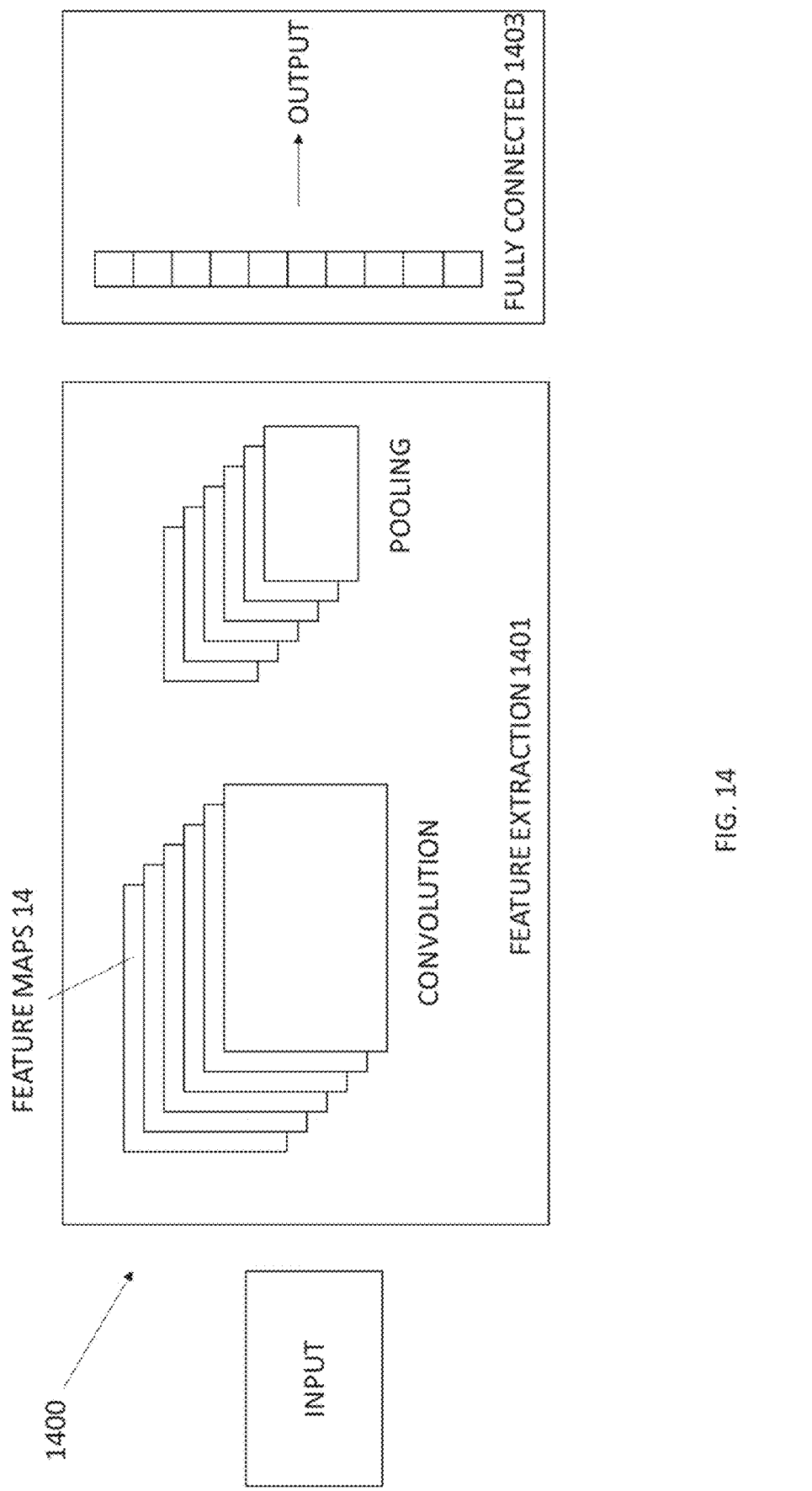
FIG. 14 is a flowchart illustrating a nose print recognition algorithm according to an exemplary embodiment of the present invention.

FIG. 14 is a flowchart illustrating a nose print recognition algorithm, generally designated by reference number 1400, according to an exemplary embodiment of the present invention. The nose print recognition algorithm 1400 includes steps of feature extraction 1401 and classification 1403. In this exemplary embodiment, the nose print recognition algorithm 1400 involves the use of a convolution neural network (CNN). CNN contains two basic operations, namely convolution and pooling. The feature extraction step 1401 employs a convolution operation, in which multiple filters are used to extract features (feature map) from the input data set, through which the extracted features corresponding spatial information can be preserved. The pooling operation, also called subsampling, is used to reduce the dimensionality of feature maps from the convolution operation. After several convolutional and pooling layers, the classification step 1403 is done via fully connected layers.

In some embodiments, remote server 1030 can be configured to register iris images instead of, or in addition to, nose print images. In such embodiments, database 1040 stores images of the irises of previously registered pets and associates those iris images with information corresponding to the pet whose iris is depicted in a corresponding image. It should be noted that the registration of irises might entail requiring a visit to a veterinarian or other health professional who would have an infrared camera necessary to acquire detail-rich and intricate structures of the iris. In such embodiments, remote server 1035 may include an iris recognition module (not shown in FIG. 10) which is configured to execute iris recognition software. Similar to nose print recognition module 1035, the iris recognition module compares a received iris image of a stray pet with registered images of pet irises and transmits information pertaining to a registered pet if a match is found.

Figure 11:
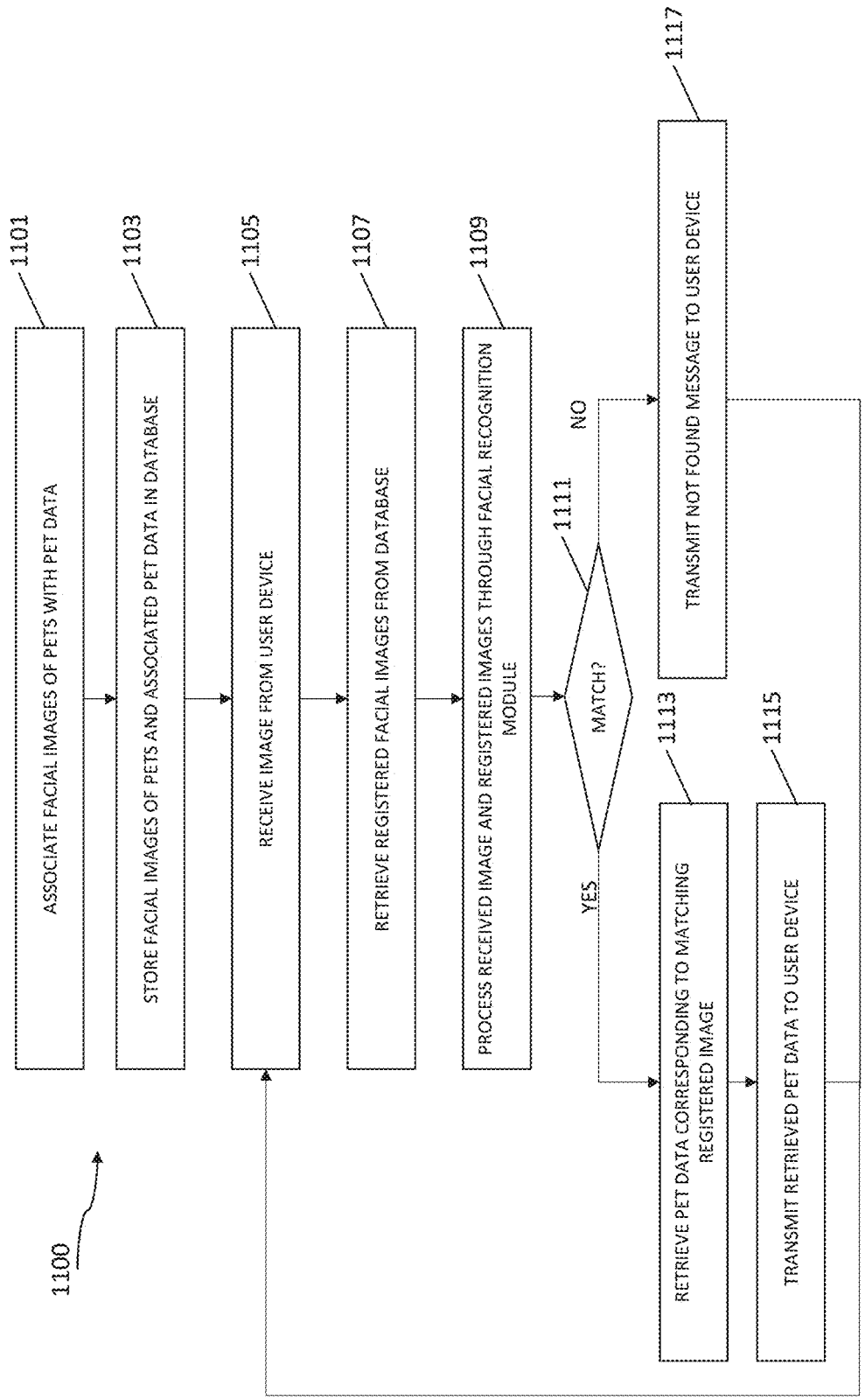
FIG. 11 is a flow diagram showing a process for a mobile communication device to communicate with a remote server to obtain information associated with a facial image of a stray pet, in accordance with exemplary embodiments of the present invention.

FIG. 11 is a flow diagram of a method 1100 for a remote server to receive requests for information associated with a photograph of a stray pet, in accordance with exemplary embodiments of the present invention. Method 1100 is carried out, in exemplary embodiments, by a remote server, such as remote server 930 depicted in FIG. 9.

Method 1100 begins at step 1101. At step 1101, one or more facial images of pets are each associated with data associated with the corresponding pet in the image. In embodiments, such associated data can include: pet owner information, pet health/medical information, one or more additional photographs of the pet, and the pet's home address. Other information relating to the pet can be associated as well. Step 1101 can be performed, in embodiments, in response to requests and interactions by an end user or administrator with either local or remote access to remote server 930. Alternatively, the facial images and pet information may be associated by an end user of a mobile device transmitting a facial image and associated pet data from a mobile device, such as mobile device 901, using an app that is executing on the device, such as Pet App 905. In such embodiments, remote server 930 receives the images and associated data along with a specified request from Pet App 905, such as "ASSOCIATE."

Next, at step 1103, once one or more facial images have been associated with pet data, the facial images and pet data are then stored in a database, such as database 940. According to embodiments, the facial images and associated pet data can be stored as records in a single table or file or, alternatively, may be stored in several tables, each having a unique pet identifier to tie the images and data together. In such embodiments, remote server 930 invokes facial recognition module 935 to create a unique facial identifier to which the pet data is then associated. Remote server 930 then stores the unique facial identifier and associated pet data in database 940.

Next, at step 1105, remote server 930 monitors for and receives an image from a user device, such as, for example, user device 901. As previously mentioned, remote server 930 receives images over link 960.

At step 1107, remote server 930 retrieves registered facial images of pets from database 940. In embodiments, the retrieved facial images have been pre-processed by facial recognition module 935 for easy comparison by that module or other facial recognition software.

At step 1109, remote server 930 processes the received images and, if not pre-processed, the registered facial images using facial recognition module 935, according to facial recognition techniques known in the art. At step 1111, remote server 930 determines whether the processed received images matches any one of the retrieved registered facial images from database 940. If there is a match, method 1100 proceeds to step 1113. If no match is found, then method 1100 proceeds to step 1117.

At step 1113, remote server 930 retrieves pet data associated with the matching registered facial image. In accordance with exemplary embodiments, the associated pet data may include additional photographs of the pet, owner information for the pet, behavioral information for the pet, and medical information for the pet.

Next, at step 1115, remote server 930 transmits the retrieved associated pet data to the user device that sent the pet image. After step 1115, method 1100 returns to step 1105 to monitor for and receive an image from a user device 160.

In the case where a match was not found, at step 1111, by facial recognition module 935, method 1100 proceeds to step 1117. At step 1117, remote server 930 transmits a message to the user device 160 from which the server received the pet image that indicates that the pet corresponding to the received image was not found. After step 1117, method 1100 returns to step 1105 to monitor for and receive an image from a user device 160.

Figure 12:
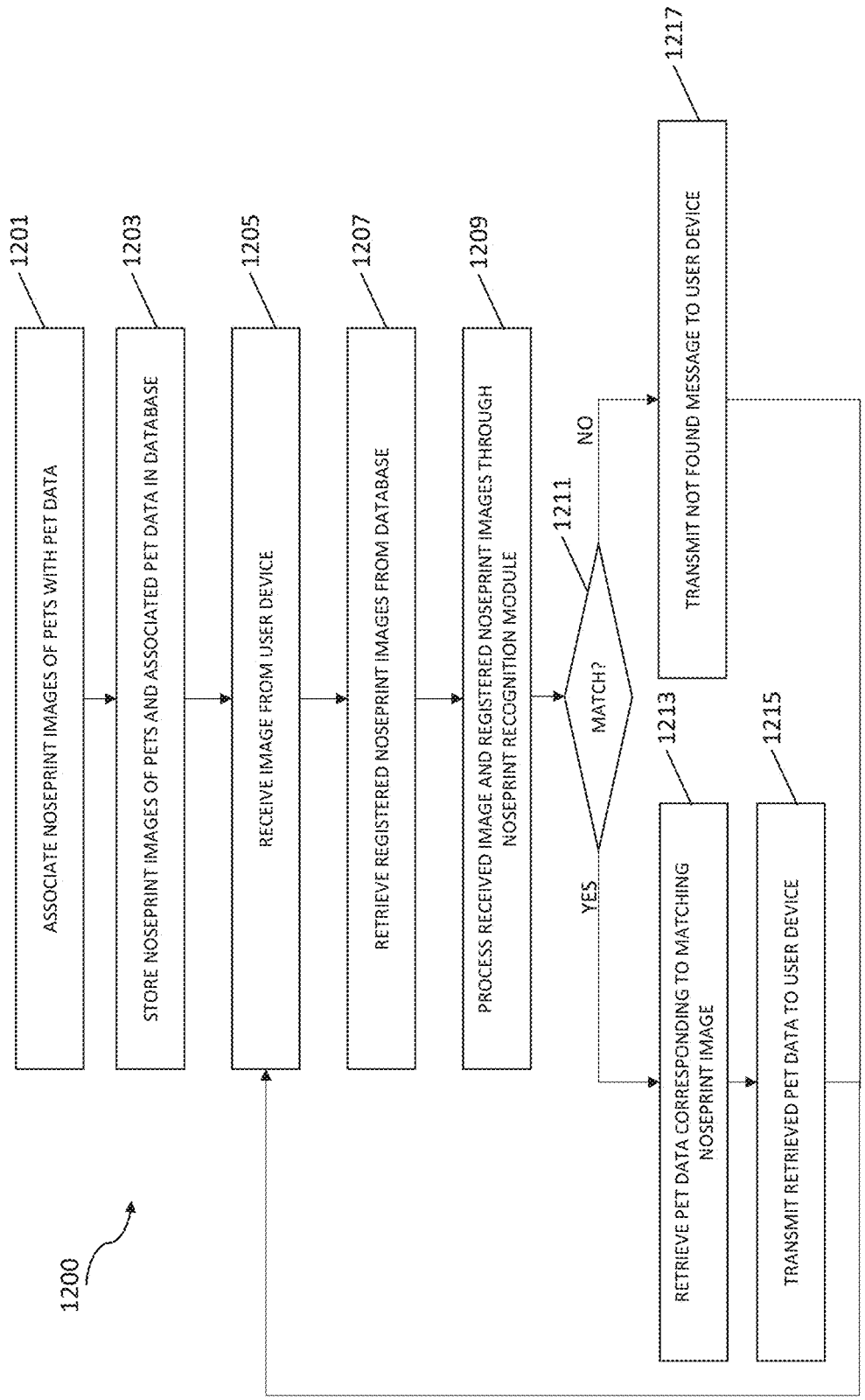
FIG. 12 is a flow diagram showing a process for a mobile communication device to communicate with a remote server to obtain information associated with a nose print image of a stray pet, in accordance with exemplary embodiments of the present invention.

FIG. 12 is a flow diagram of a method 1200 for a remote server to receive requests for information associated with a photograph of a nose print of a stray pet, in accordance with exemplary embodiments of the present invention. Method 1200 is carried out, in exemplary embodiments, by a remote server, such as remote server 930 depicted in FIG. 9.

Method 1200 begins at step 1201. At step 1201, one or more nose print images of pets are each associated with data associated with the pet that corresponds to the respective nose print. In embodiments, such associated data can include: pet owner information, pet health/medical information, one or more additional photographs of the pet, and the pet's home address. Other information relating to the pet can be associated as well. Step 1201 can be performed, in embodiments, in response to requests and interactions by an end user or administrator with either local or remote access to remote server 930. Alternatively, the nose print images and pet information may be associated by an end user of a mobile device transmitting a nose print image and associated pet data from a mobile device, such as mobile device 901, using an app that is executing on the device, such as Pet App 905. In such embodiments, remote server 930 receives the images and associated data along with a specified request from Pet App 905, such as "ASSOCIATE."

Next, at step 1203, once one or more nose print images have been associated with pet data, the nose print images and pet data are then stored in a database, such as database 940. According to embodiments, the nose print images and associated pet data can be stored as records in a single table or file or, alternatively, may be stored in several tables, each having a unique pet identifier to tie the images and data together. In such embodiments, remote server 930 invokes nose print recognition module 1035 in order to create a unique nose print identifier to which the pet data is then associated. Remote server 930 then stores the unique nose print identifier and associated pet data in database 940.

Next, at step 1205, remote server 930 monitors for and receives an image from a user device, such as, for example, user device 901. As previously mentioned, remote server 930 receives images over link 960.

At step 1207, remote server 930 retrieves registered nose print images of pets from database 940. In embodiments, the retrieved nose print images have been pre-processed by nose print recognition module 1035 for easy comparison by that module or other image recognition software.

At step 1209, remote server 930 processes the received images and, if not pre-processed, the registered nose print images using nose print recognition module 1035, according to nose print recognition techniques known in the art. At step 1211, remote server 930 determines whether the processed received images matches any one of the retrieved registered nose print images from database 940. If there is a match, method 1200 proceeds to step 1213. If no match is found, then method 1200 proceeds to step 1217.

At step 1213, remote server 930 retrieves pet data associated with the matching registered nose print image. In accordance with exemplary embodiments, the associated pet data may include additional photographs of the pet, owner information for the pet, behavioral information for the pet, and medical information for the pet.

Next, at step 1215, remote server 930 transmits the retrieved associated pet data to the user device that sent the pet image. After step 1215, method 1200 returns to step 1205 to monitor for and receive an image from a user device 160.

In the case where a match was not found, at step 1211, by nose print recognition module 1035, method 1200 proceeds to step 1217. At step 1217, remote server 930 transmits a message to the user device 160 from which the server received the pet image that indicates that the pet corresponding to the received image was not found. After step 1217, method 1200 returns to step 1205 to monitor for and receive an image from a user device 160.

Further, as an alternative to the use of nose print images, method 1200 may be carried out, in embodiments, in a similar manner using iris recognition software. In such embodiments, one or more iris images are registered by remote server 930 and stored in database 1040. The registered iris images are compared to received images of irises of stray pets and are analyzed for a match in in accordance with iris recognition techniques.

Figure 15:
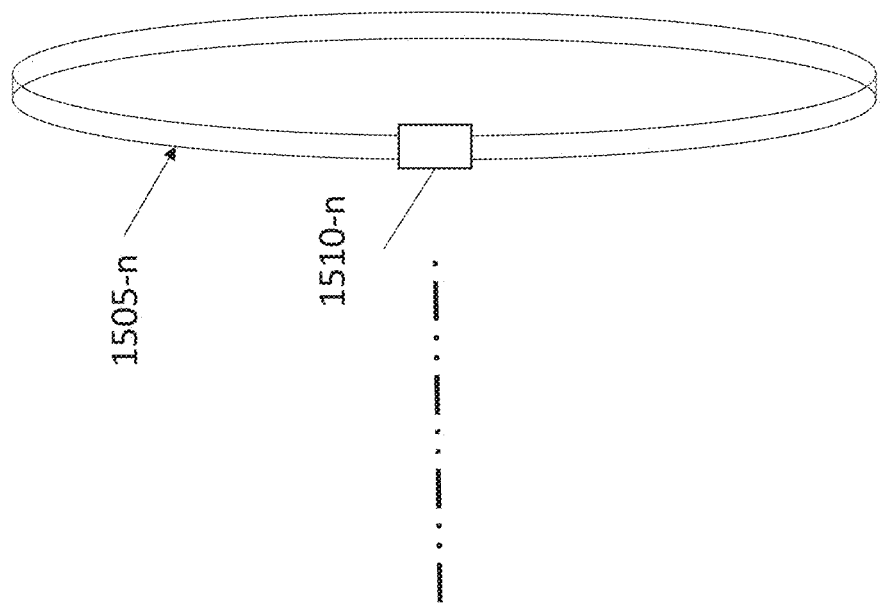
FIG. 15 is a representative diagram of a pet tagging system according to an exemplary embodiment of the present invention.
Figure 15:
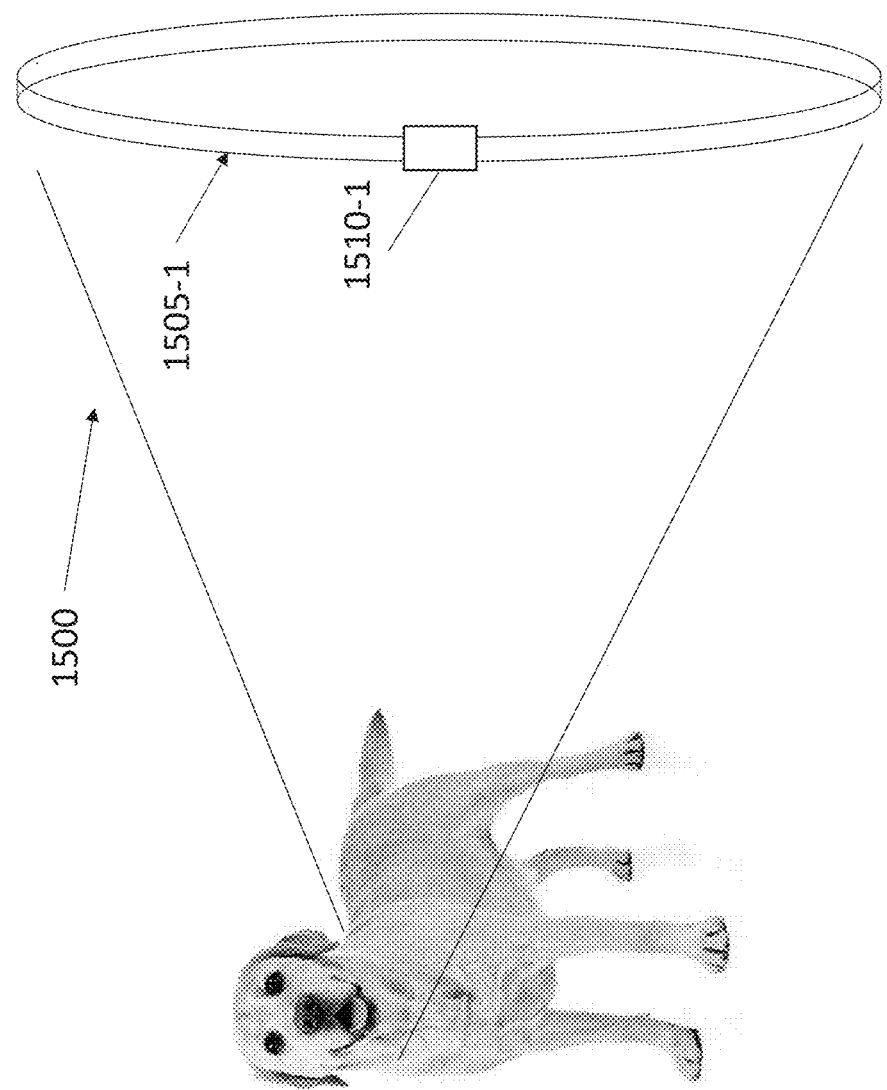

FIG. 15 is a representative diagram of a pet tagging system, generally designated by reference number 1500, according to an exemplary embodiment of the present invention. The pet tagging system 1500 may include a plurality of temporary bands **1505-1-1505-*n*, with each temporary band 1505-1-1505-*n* holding a corresponding pet ID tag 1510-1-1510-*n*. In exemplary embodiments, the pet ID tags 1510-1-1510-*n* may have all the structure and functionality as pet ID tags 110, including, for example, a unique identifier and GPS. The temporary bands 1510-1-1510-*n* are configured for attachment to unaccompanied animals after an emergency or some other incident. For example, the temporary bands 1510-1-1510-*n* may be made of elastic material for easy placement around an animal's neck or other part of the animal's anatomy. A first responder may tag the animal (or its cage) with one of the temporary bands 1510-1-1510-*n*, and then use a mobile device to take a picture or two of the animal. The mobile device automatically identifies and records the exact location where the photographs are taken. The tagged and unaccompanied animal are then sent to a designated rescue location. The photographs along with information regarding the location where the pet may be compiled in a lost pet database, and the database may be published online for pet owners to search for their lost pets after an emergency or other incident. This lost pet database may have search tools such as, for example, location where the pet may have been found and identifying characteristics, such as breed, markings, color, etc. Upon discovery of a lost pet on the lost pet database, an owner may contact the operator of the lost pet database. The operator may then locate the pet by cross-referencing the identified pet with the unique identifier associated with the pet ID tag 1510-1-1510-$n$ on the temporary band 1510-1-1510-$n$ worn by that pet. The unique identifier can then be used to locate the pet by accessing information on a remote server that had been gathering information from the pet ID tag 1510-1-1510-$n$** since the animal was first discovered after the emergency or other incident.

Figure 16:
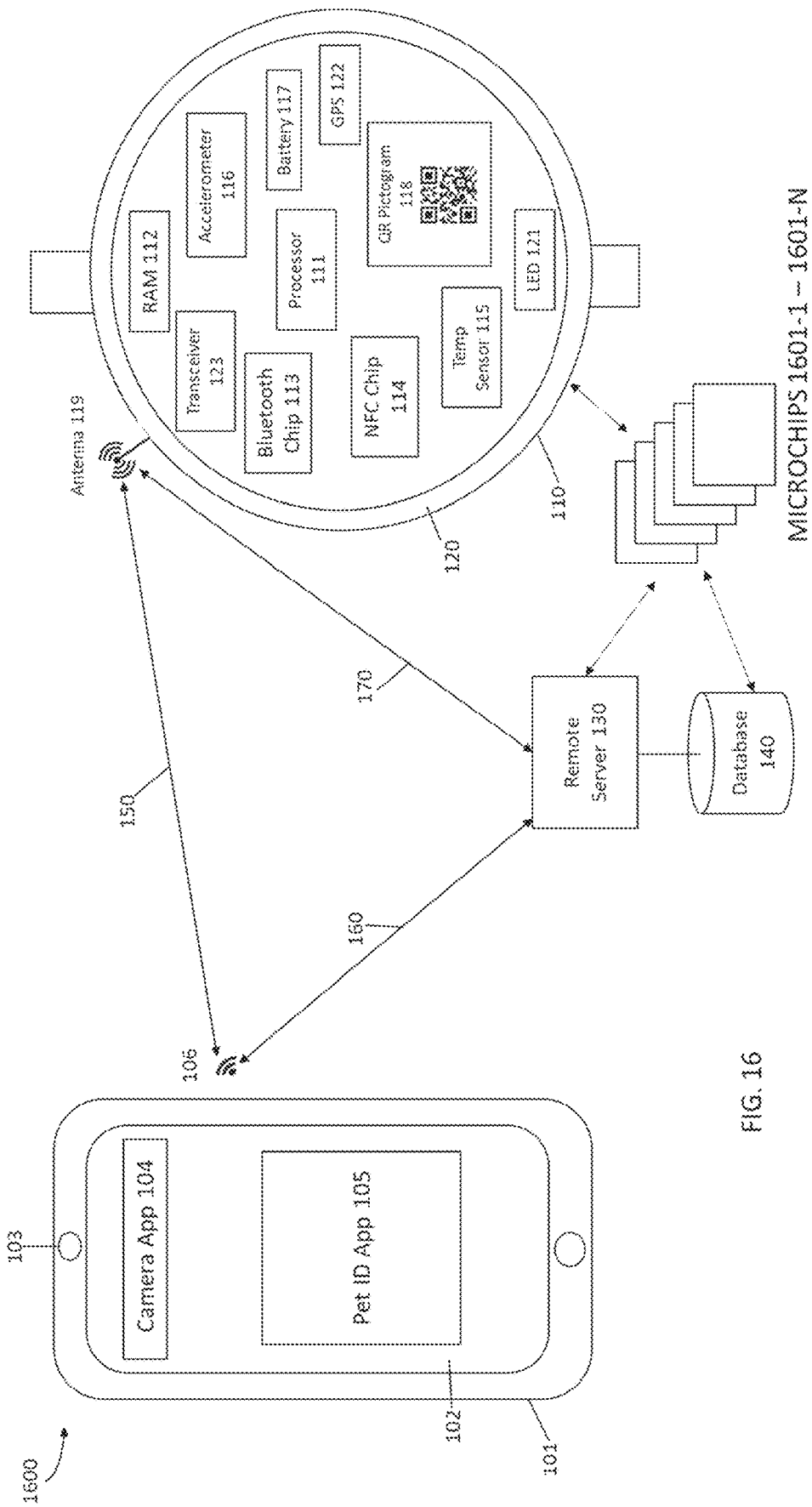
FIG. 16 illustrates an exemplary pet identification system in accordance with exemplary embodiments of the present invention.

FIG. 16 is a block diagram that illustrates a system, generally designated by reference number 1600, in accordance with an exemplary embodiment of the present invention. The system 1600 may include the same components as the system 100 as previously described with reference to FIG. 1, including a mobile computing device 101, a pet ID tag 110, and a remote server 100. The system 1600 may also incorporate microchip transponders 1601-1-1601-$n$ that are injectable into pets and other animals. The microchip transponders 1601-1-1601-$n$ may be conventional injectable microchip transponders such as those available from Avery Dennison Corporation, Glendale, California, USA. In exemplary embodiments, the microchip transponders 1601-1-1601-$n$ may have unique identifiers, such as unique serial numbers or some other identifying information, that are the same as or correlated with the unique identifiers associated with the pet ID tags 110 within the system 1600. Accordingly, the unique identifiers of the microchip transponders 1601-1-1601-$n$ may be used to cross-reference information from a pet registry database linked to the pet ID tags, such as the database 140. In exemplary embodiments, the microchip transponders 1601-1-1601-$n$ may be configured for one-way or two-communication with mobile computing device 101, pet ID tags 110, and/or remote server 100.

Now that embodiments of the present invention have been shown and described in detail, various modifications and improvements thereon can become readily apparent to those skilled in the art. Accordingly, the exemplary embodiments of the present invention, as set forth above, are intended to be illustrative, not limiting. The spirit and scope of the present invention is to be construed broadly.

What is claimed is:

1. A system for identifying information associated with a pet, the system comprising:
   (A) one or more wireless communication devices each configured to be affixed to a corresponding one of one or more pets;
   (B) one or more databases having stored thereon information comprising:
      1) one or more unique identifiers, where each of the one or more unique identifiers is associated with a corresponding one of the one or more wireless communication devices;
      2) pet information related to each of the one or more unique identifiers, the pet information comprising one or more of the following: images of the corresponding pet, contact information associated with the corresponding pet, environmental conditions associated with the corresponding pet, behavior of the corresponding pet, and medical history of the corresponding pet;
   (C) one or more processors; and
   (D) a non-transitory computer readable memory operatively connected to the one or more processors and having stored thereon machine-readable instructions that, when executed by the one or more processors, cause the one or more processors to perform a method comprising:
      1) receiving a first request from a mobile device, the first request comprising a digital photograph of at least a portion of a face of a pet;
      2) identifying the pet based on the received digital photograph, the step of identifying comprising:
         (i) comparing the digital photograph to images of corresponding pets within the one or more databases; and
         (ii) identifying a match between the digital photograph and one of the images within the one or more databases so as to identify the pet as one of the pets associated with one of the one or more unique identifiers; and
      3) sending, to the mobile device, a first response, the step of sending comprising:
         (i) accessing, from the one or more databases, pet information corresponding to the one of the one or more unique identifiers associated with the pet; and
         (ii) sending at least some of the accessed pet information to the mobile device;
   wherein the one or more wireless communication devices are configured to communicate with other electronic devices by a near-field communication link;
   wherein the first near-field communication link is a link in a mesh communication network; and
   wherein the at least a portion of the face of the pet comprises an iris of the pet.

2. The system of claim 1, wherein the near-field communication link is a WiFi communication link.

3. The system of claim 1, wherein each of the one or more wireless communication devices comprises:
   a housing;
   an antenna;
   a wireless transceiver operatively connected to the antenna;
   one or more near-field communication chips configured to transmit and receive electronic data via the wireless transceiver; and
   a non-transitory computer readable memory disposed within the housing.

4. The system of claim 3, wherein each of the one or more wireless communication devices further comprise one or more sensor components configured to detect status of the wireless communication device.

5. The system of claim 4, wherein the one or more sensor components comprise:
   an accelerometer configured to measure an acceleration status of the wireless communication device;
   a global positioning module configured to determine a geographic location status of the wireless communication device; and
   a temperature sensor configured to determine an ambient temperature status of the wireless communication device.

6. The system of claim 4, wherein the detected status is stored in the non-transitory computer-readable memory of the corresponding one or more wireless communication devices.

7. The system of claim 3, wherein the one or more wireless communication devices further comprise:
   a battery configured to provide power to the wireless communication device; and a lighting element configured to illuminate the wireless communication device.

8. The system of claim 6, further comprising a remote server.

9. The system of claim 8, wherein the method further comprises:
   receiving, by the one of the one or more wireless communication devices, from the remote server, a second request; and
   sending, in response to the second request, from the one of the one or more wireless communications devices, to the remote server, the detected status of the one of the one or more wireless communication devices, for storage in the one or more databases as associated with the corresponding unique identifier of the one of the one or more wireless communication devices.

\* \* \* \* \*